United States Patent
Uzun et al.

(10) Patent No.: US 9,552,493 B2
(45) Date of Patent: Jan. 24, 2017

(54) ACCESS CONTROL FRAMEWORK FOR INFORMATION CENTRIC NETWORKING

(71) Applicant: Palo Alto Research Center Incorporated, Palo Alto, CA (US)

(72) Inventors: Ersin Uzun, Campbell, CA (US); Jun Kurihara, Fujimi (JP); Christopher A. Wood, Newport Beach, CA (US)

(73) Assignee: PALO ALTO RESEARCH CENTER INCORPORATED, Palo Alto, CA (US)

( * ) Notice: Subject to any disclaimer, the term of this patent is extended or adjusted under 35 U.S.C. 154(b) by 75 days.

(21) Appl. No.: 14/613,205

(22) Filed: Feb. 3, 2015

(65) Prior Publication Data

US 2016/0224799 A1     Aug. 4, 2016

(51) Int. Cl.
| | |
|---|---|
| *H04L 9/00* | (2006.01) |
| *G06F 21/62* | (2013.01) |
| *H04L 29/06* | (2006.01) |
| *H04L 29/08* | (2006.01) |

(52) U.S. Cl.
CPC ....... *G06F 21/6227* (2013.01); *H04L 63/0428* (2013.01); *H04L 63/06* (2013.01); *H04L 63/10* (2013.01); *H04L 63/0442* (2013.01); *H04L 67/2842* (2013.01)

(58) Field of Classification Search
CPC ...... G06F 21/6218; G06F 21/10; G06F 21/60; G06F 21/62; G06F 21/6227; H04L 63/20
USPC .................. 713/165, 167, 189; 726/1, 26–30
See application file for complete search history.

(56) References Cited

U.S. PATENT DOCUMENTS

| | | |
|---|---|---|
| 817,441 A | 4/1906 | Niesz |
| 4,309,569 A | 1/1982 | Merkle |
| 4,921,898 A | 5/1990 | Lenney |
| 5,070,134 A | 12/1991 | Oyamada |

(Continued)

FOREIGN PATENT DOCUMENTS

| | | |
|---|---|---|
| DE | 1720277 A1 | 6/1967 |
| DE | 19620817 A1 | 11/1997 |

(Continued)

OTHER PUBLICATIONS

Xie et al. "Collaborative Forwarding and Caching in Content Centric Networks", Networking 2012.

(Continued)

*Primary Examiner* — Hosuk Song
(74) *Attorney, Agent, or Firm* — Shun Yao; Park, Vaughan, Fleming & Dowler LLP

(57) ABSTRACT

One embodiment provides an access-control framework for publishing and obtaining a collection of encrypted data in encrypted form. During operation, a content consumer can obtain a Manifest object for a data collection, such that the Manifest includes references to a set of encrypted Content Objects of the data collection, and includes one or more Access Control Specifications (ACS) that each specifies a decryption protocol for decrypting one or more Content Objects of the data collection. The consumer can disseminate Interest messages to receive encrypted Content Objects listed in the Manifest over an Information Centric Network (ICN). The client can also obtain, from the Manifest, an ACS associated with a respective encrypted Content Object, and decrypts the respective encrypted Content Object using the decryption protocol specified in the ACS.

18 Claims, 11 Drawing Sheets

(56) References Cited

U.S. PATENT DOCUMENTS

| | | |
|---|---|---|
| 5,110,856 A | 5/1992 | Oyamada |
| 5,506,844 A | 4/1996 | Rao |
| 5,629,370 A | 5/1997 | Freidzon |
| 5,870,605 A | 2/1999 | Bracho |
| 6,052,683 A | 4/2000 | Irwin |
| 6,091,724 A | 7/2000 | Chandra |
| 6,173,364 B1 | 1/2001 | Zenchelsky |
| 6,226,618 B1 | 5/2001 | Downs |
| 6,233,646 B1 | 5/2001 | Hahm |
| 6,332,158 B1 | 12/2001 | Risley |
| 6,366,988 B1 | 4/2002 | Skiba |
| 6,574,377 B1 | 6/2003 | Cahill |
| 6,654,792 B1 | 11/2003 | Verma |
| 6,667,957 B1 | 12/2003 | Corson |
| 6,681,220 B1 | 1/2004 | Kaplan |
| 6,681,326 B2 | 1/2004 | Son |
| 6,769,066 B1 | 7/2004 | Botros |
| 6,772,333 B1 | 8/2004 | Brendel |
| 6,862,280 B1 | 3/2005 | Bertagna |
| 6,901,452 B1 | 5/2005 | Bertagna |
| 6,917,985 B2 | 7/2005 | Madruga |
| 6,968,393 B1 | 11/2005 | Chen |
| 6,981,029 B1 | 12/2005 | Menditto |
| 7,013,389 B1 | 3/2006 | Srivastava |
| 7,031,308 B2 | 4/2006 | Garcia-Luna-Aceves |
| 7,061,877 B1 | 6/2006 | Gummalla |
| 7,206,860 B2 | 4/2007 | Murakami |
| 7,257,837 B2 | 8/2007 | Xu |
| 7,287,275 B2 | 10/2007 | Moskowitz |
| 7,315,541 B1 | 1/2008 | Housel |
| 7,339,929 B2 | 3/2008 | Zelig |
| 7,350,229 B1 | 3/2008 | Lander |
| 7,382,787 B1 | 6/2008 | Barnes |
| 7,444,251 B2 | 10/2008 | Nikovski |
| 7,466,703 B1 | 12/2008 | Arunachalam |
| 7,472,422 B1 | 12/2008 | Agbabian |
| 7,496,668 B2 | 2/2009 | Hawkinson |
| 7,509,425 B1 | 3/2009 | Rosenberg |
| 7,523,016 B1 | 4/2009 | Surdulescu |
| 7,543,064 B2 | 6/2009 | Juncker |
| 7,552,233 B2 | 6/2009 | Raju |
| 7,555,482 B2 | 6/2009 | Korkus |
| 7,555,563 B2 | 6/2009 | Ott |
| 7,567,547 B2 | 7/2009 | Mosko |
| 7,567,946 B2 | 7/2009 | Andreoli |
| 7,577,838 B1* | 8/2009 | Rossmann .......... G06F 21/6218 713/165 |
| 7,580,971 B1 | 8/2009 | Gollapudi |
| 7,623,535 B2 | 11/2009 | Guichard |
| 7,647,507 B1 | 1/2010 | Feng |
| 7,660,324 B2 | 2/2010 | Oguchi |
| 7,685,290 B2 | 3/2010 | Satapati |
| 7,698,463 B2 | 4/2010 | Ogier |
| 7,769,887 B1 | 8/2010 | Bhattacharyya |
| 7,779,467 B2 | 8/2010 | Choi |
| 7,801,177 B2 | 9/2010 | Luss |
| 7,816,441 B2 | 10/2010 | Elizalde |
| 7,831,733 B2 | 11/2010 | Sultan |
| 7,908,337 B2 | 3/2011 | Garcia-Luna-Aceves |
| 7,921,450 B1* | 4/2011 | Vainstein ............ G06F 21/6209 380/285 |
| 7,924,837 B1 | 4/2011 | Shabtay |
| 7,953,885 B1 | 5/2011 | Devireddy |
| 8,000,267 B2 | 8/2011 | Solis |
| 8,010,691 B2 | 8/2011 | Kollmansberger |
| 8,060,940 B2* | 11/2011 | McCorkendale ... G06F 21/6218 726/1 |
| 8,074,289 B1 | 12/2011 | Carpentier |
| 8,117,441 B2 | 2/2012 | Kurien |
| 8,160,069 B2 | 4/2012 | Jacobson |
| 8,204,060 B2 | 6/2012 | Jacobson |
| 8,214,364 B2 | 7/2012 | Bigus |
| 8,224,985 B2 | 7/2012 | Takeda |
| 8,225,057 B1 | 7/2012 | Zheng |
| 8,271,578 B2 | 9/2012 | Sheffi |
| 8,312,064 B1 | 11/2012 | Gauvin |
| 8,386,622 B2 | 2/2013 | Jacobson |
| 8,407,462 B2* | 3/2013 | Xie ..................... H04L 63/0227 370/401 |
| 8,467,297 B2 | 6/2013 | Liu |
| 8,543,827 B2* | 9/2013 | Garcia ................ G06F 21/6209 713/166 |
| 8,553,562 B2 | 10/2013 | Allan |
| 8,572,214 B2 | 10/2013 | Garcia-Luna-Aceves |
| 8,654,649 B2 | 2/2014 | Vasseur |
| 8,665,757 B2 | 3/2014 | Kling |
| 8,667,172 B2 | 3/2014 | Ravindran |
| 8,688,619 B1 | 4/2014 | Ezick |
| 8,699,350 B1 | 4/2014 | Kumar |
| 8,750,820 B2 | 6/2014 | Allan |
| 8,761,022 B2 | 6/2014 | Chiabaut |
| 8,762,477 B2 | 6/2014 | Xie |
| 8,762,570 B2 | 6/2014 | Qian |
| 8,762,707 B2 | 6/2014 | Killian |
| 8,767,627 B2 | 7/2014 | Ezure |
| 8,817,594 B2 | 8/2014 | Gero |
| 8,826,381 B2 | 9/2014 | Kim |
| 8,832,302 B1 | 9/2014 | Bradford |
| 8,836,536 B2 | 9/2014 | Marwah |
| 8,862,774 B2 | 10/2014 | Vasseur |
| 8,903,756 B2 | 12/2014 | Zhao |
| 8,937,865 B1 | 1/2015 | Kumar |
| 9,071,498 B2 | 6/2015 | Beser |
| 9,112,895 B1 | 8/2015 | Lin |
| 2002/0010795 A1 | 1/2002 | Brown |
| 2002/0048269 A1 | 4/2002 | Hong |
| 2002/0054593 A1 | 5/2002 | Morohashi |
| 2002/0077988 A1 | 6/2002 | Sasaki |
| 2002/0078066 A1 | 6/2002 | Robinson |
| 2002/0138551 A1 | 9/2002 | Erickson |
| 2002/0176404 A1 | 11/2002 | Girard |
| 2002/0188605 A1 | 12/2002 | Adya |
| 2002/0199014 A1 | 12/2002 | Yang |
| 2003/0046437 A1 | 3/2003 | Eytchison |
| 2003/0048793 A1 | 3/2003 | Pochon |
| 2003/0051100 A1 | 3/2003 | Patel |
| 2003/0074472 A1 | 4/2003 | Lucco |
| 2003/0097447 A1 | 5/2003 | Johnston |
| 2003/0140257 A1 | 7/2003 | Peterka |
| 2004/0024879 A1 | 2/2004 | Dingman |
| 2004/0030602 A1 | 2/2004 | Rosenquist |
| 2004/0073715 A1 | 4/2004 | Folkes |
| 2004/0139230 A1 | 7/2004 | Kim |
| 2004/0221047 A1 | 11/2004 | Grover |
| 2004/0225627 A1 | 11/2004 | Botros |
| 2004/0252683 A1 | 12/2004 | Kennedy |
| 2005/0003832 A1 | 1/2005 | Osafune |
| 2005/0028156 A1 | 2/2005 | Hammond |
| 2005/0043060 A1 | 2/2005 | Brandenberg |
| 2005/0050211 A1 | 3/2005 | Kaul |
| 2005/0074001 A1 | 4/2005 | Mattes |
| 2005/0149508 A1 | 7/2005 | Deshpande |
| 2005/0159823 A1 | 7/2005 | Hayes |
| 2005/0198351 A1 | 9/2005 | Nog |
| 2005/0249196 A1 | 11/2005 | Ansari |
| 2005/0259637 A1 | 11/2005 | Chu |
| 2005/0262217 A1 | 11/2005 | Nonaka |
| 2005/0289222 A1 | 12/2005 | Sahim |
| 2006/0010249 A1 | 1/2006 | Sabesan |
| 2006/0029102 A1 | 2/2006 | Abe |
| 2006/0039379 A1 | 2/2006 | Abe |
| 2006/0051055 A1 | 3/2006 | Ohkawa |
| 2006/0072523 A1 | 4/2006 | Richardson |
| 2006/0099973 A1 | 5/2006 | Nair |
| 2006/0129514 A1 | 6/2006 | Watanabe |
| 2006/0133343 A1 | 6/2006 | Huang |
| 2006/0173831 A1 | 8/2006 | Basso |
| 2006/0193295 A1 | 8/2006 | White |
| 2006/0206445 A1 | 9/2006 | Andreoli |
| 2006/0215684 A1 | 9/2006 | Capone |
| 2006/0223504 A1 | 10/2006 | Ishak |
| 2006/0256767 A1 | 11/2006 | Suzuki |
| 2006/0268792 A1 | 11/2006 | Belcea |
| 2007/0019619 A1 | 1/2007 | Foster |

(56) References Cited

U.S. PATENT DOCUMENTS

| | | |
|---|---|---|
| 2007/0073888 A1 | 3/2007 | Madhok |
| 2007/0094265 A1 | 4/2007 | Korkus |
| 2007/0112880 A1 | 5/2007 | Yang |
| 2007/0124412 A1 | 5/2007 | Narayanaswami |
| 2007/0127457 A1 | 6/2007 | Mirtorabi |
| 2007/0160062 A1 | 7/2007 | Morishita |
| 2007/0162394 A1 | 7/2007 | Zager |
| 2007/0189284 A1 | 8/2007 | Kecskemeti |
| 2007/0195765 A1 | 8/2007 | Heissenbuttel |
| 2007/0204011 A1 | 8/2007 | Shaver |
| 2007/0209067 A1 | 9/2007 | Fogel |
| 2007/0239892 A1 | 10/2007 | Ott |
| 2007/0240207 A1 | 10/2007 | Belakhdar |
| 2007/0245034 A1 | 10/2007 | Retana |
| 2007/0253418 A1 | 11/2007 | Shiri |
| 2007/0255699 A1 | 11/2007 | Sreenivas |
| 2007/0255781 A1 | 11/2007 | Li |
| 2007/0274504 A1 | 11/2007 | Maes |
| 2007/0276907 A1 | 11/2007 | Maes |
| 2007/0294187 A1 | 12/2007 | Scherrer |
| 2008/0005056 A1 | 1/2008 | Stelzig |
| 2008/0010366 A1 | 1/2008 | Duggan |
| 2008/0037420 A1 | 2/2008 | Tang |
| 2008/0043989 A1 | 2/2008 | Furutono |
| 2008/0046340 A1 | 2/2008 | Brown |
| 2008/0059631 A1 | 3/2008 | Bergstrom |
| 2008/0080440 A1 | 4/2008 | Yarvis |
| 2008/0101357 A1 | 5/2008 | Iovanna |
| 2008/0107034 A1 | 5/2008 | Jetcheva |
| 2008/0123862 A1 | 5/2008 | Rowley |
| 2008/0133583 A1 | 6/2008 | Artan |
| 2008/0133755 A1 | 6/2008 | Pollack |
| 2008/0151755 A1 | 6/2008 | Nishioka |
| 2008/0159271 A1 | 7/2008 | Kutt |
| 2008/0186901 A1 | 8/2008 | Itagaki |
| 2008/0200153 A1 | 8/2008 | Fitzpatrick |
| 2008/0215669 A1 | 9/2008 | Gaddy |
| 2008/0216086 A1 | 9/2008 | Tanaka |
| 2008/0243992 A1 | 10/2008 | Jardetzky |
| 2008/0256359 A1 | 10/2008 | Kahn |
| 2008/0270618 A1 | 10/2008 | Rosenberg |
| 2008/0271143 A1 | 10/2008 | Stephens |
| 2008/0287142 A1 | 11/2008 | Keighran |
| 2008/0288580 A1 | 11/2008 | Wang |
| 2008/0320148 A1 | 12/2008 | Capuozzo |
| 2009/0006659 A1 | 1/2009 | Collins |
| 2009/0013324 A1 | 1/2009 | Gobara |
| 2009/0022154 A1 | 1/2009 | Kiribe |
| 2009/0024641 A1 | 1/2009 | Quigley |
| 2009/0030978 A1 | 1/2009 | Johnson |
| 2009/0037763 A1 | 2/2009 | Adhya |
| 2009/0052660 A1 | 2/2009 | Chen |
| 2009/0067429 A1 | 3/2009 | Nagai |
| 2009/0077184 A1 | 3/2009 | Brewer |
| 2009/0092043 A1 | 4/2009 | Lapuh |
| 2009/0097631 A1 | 4/2009 | Gisby |
| 2009/0103515 A1 | 4/2009 | Pointer |
| 2009/0113068 A1 | 4/2009 | Fujihira |
| 2009/0144300 A1 | 6/2009 | Chatley |
| 2009/0157887 A1 | 6/2009 | Froment |
| 2009/0185745 A1 | 7/2009 | Momosaki |
| 2009/0193101 A1 | 7/2009 | Munetsugu |
| 2009/0222344 A1 | 9/2009 | Greene |
| 2009/0228593 A1 | 9/2009 | Takeda |
| 2009/0254572 A1 | 10/2009 | Redlich |
| 2009/0268905 A1 | 10/2009 | Matsushima |
| 2009/0285209 A1 | 11/2009 | Stewart |
| 2009/0287835 A1 | 11/2009 | Jacobson |
| 2009/0288163 A1 | 11/2009 | Jacobson |
| 2009/0292743 A1 | 11/2009 | Bigus |
| 2009/0293121 A1 | 11/2009 | Bigus |
| 2009/0300079 A1 | 12/2009 | Shitomi |
| 2009/0300407 A1 | 12/2009 | Kamath |
| 2009/0307333 A1 | 12/2009 | Welingkar |
| 2009/0323632 A1 | 12/2009 | Nix |
| 2010/0005061 A1 | 1/2010 | Basco |
| 2010/0027539 A1 | 2/2010 | Beverly |
| 2010/0046546 A1 | 2/2010 | Ram |
| 2010/0057929 A1 | 3/2010 | Merat |
| 2010/0088370 A1 | 4/2010 | Wu |
| 2010/0094767 A1 | 4/2010 | Miltonberger |
| 2010/0098093 A1 | 4/2010 | Ejzak |
| 2010/0100465 A1 | 4/2010 | Cooke |
| 2010/0103870 A1 | 4/2010 | Garcia-Luna-Aceves |
| 2010/0124191 A1 | 5/2010 | Vos |
| 2010/0125911 A1 | 5/2010 | Bhaskaran |
| 2010/0131660 A1 | 5/2010 | Dec |
| 2010/0150155 A1 | 6/2010 | Napierala |
| 2010/0165976 A1 | 7/2010 | Khan |
| 2010/0169478 A1 | 7/2010 | Saha |
| 2010/0169503 A1 | 7/2010 | Kollmansberger |
| 2010/0180332 A1 | 7/2010 | Ben-Yochanan |
| 2010/0182995 A1 | 7/2010 | Hwang |
| 2010/0185753 A1 | 7/2010 | Liu |
| 2010/0195653 A1 | 8/2010 | Jacobson |
| 2010/0195654 A1 | 8/2010 | Jacobson |
| 2010/0195655 A1 | 8/2010 | Jacobson |
| 2010/0217874 A1 | 8/2010 | Anantharaman |
| 2010/0232402 A1 | 9/2010 | Przybysz |
| 2010/0232439 A1 | 9/2010 | Dham |
| 2010/0235516 A1 | 9/2010 | Nakamura |
| 2010/0246549 A1 | 9/2010 | Zhang |
| 2010/0250497 A1 | 9/2010 | Redlich |
| 2010/0250939 A1 | 9/2010 | Adams |
| 2010/0268782 A1 | 10/2010 | Zombek |
| 2010/0272107 A1 | 10/2010 | Papp |
| 2010/0284309 A1 | 11/2010 | Allan |
| 2010/0284404 A1 | 11/2010 | Gopinath |
| 2010/0293293 A1 | 11/2010 | Beser |
| 2010/0322249 A1 | 12/2010 | Thathapudi |
| 2011/0013637 A1 | 1/2011 | Xue |
| 2011/0022812 A1 | 1/2011 | vander Linden |
| 2011/0055392 A1 | 3/2011 | Shen |
| 2011/0055921 A1 | 3/2011 | Narayanaswamy |
| 2011/0090908 A1 | 4/2011 | Jacobson |
| 2011/0106755 A1 | 5/2011 | Hao |
| 2011/0145597 A1 | 6/2011 | Yamaguchi |
| 2011/0145858 A1 | 6/2011 | Philpott |
| 2011/0153840 A1 | 6/2011 | Narayana |
| 2011/0161408 A1 | 6/2011 | Kim |
| 2011/0202609 A1 | 8/2011 | Chaturvedi |
| 2011/0231578 A1 | 9/2011 | Nagappan |
| 2011/0239256 A1 | 9/2011 | Gholmieh |
| 2011/0258049 A1 | 10/2011 | Ramer |
| 2011/0264824 A1 | 10/2011 | Venkata Subramanian |
| 2011/0265174 A1 | 10/2011 | Thornton |
| 2011/0271007 A1 | 11/2011 | Wang |
| 2011/0286457 A1 | 11/2011 | Ee |
| 2011/0286459 A1 | 11/2011 | Rembarz |
| 2011/0295783 A1 | 12/2011 | Zhao |
| 2011/0299454 A1 | 12/2011 | Krishnaswamy |
| 2012/0011170 A1 | 1/2012 | Elad |
| 2012/0011551 A1 | 1/2012 | Levy |
| 2012/0036180 A1 | 2/2012 | Thornton |
| 2012/0047361 A1 | 2/2012 | Erdmann |
| 2012/0066727 A1 | 3/2012 | Nozoe |
| 2012/0106339 A1 | 5/2012 | Mishra |
| 2012/0114313 A1 | 5/2012 | Phillips |
| 2012/0120803 A1 | 5/2012 | Farkas |
| 2012/0136676 A1 | 5/2012 | Goodall |
| 2012/0136936 A1 | 5/2012 | Quintuna |
| 2012/0136945 A1 | 5/2012 | Lee |
| 2012/0137367 A1 | 5/2012 | Dupont |
| 2012/0141093 A1 | 6/2012 | Yamaguchi |
| 2012/0155464 A1 | 6/2012 | Kim |
| 2012/0158973 A1 | 6/2012 | Jacobson |
| 2012/0163373 A1 | 6/2012 | Lo |
| 2012/0179653 A1 | 7/2012 | Araki |
| 2012/0197690 A1 | 8/2012 | Agulnek |
| 2012/0198048 A1 | 8/2012 | Ioffe |
| 2012/0221150 A1 | 8/2012 | Arensmeier |
| 2012/0224487 A1 | 9/2012 | Hui |
| 2012/0257500 A1 | 10/2012 | Lynch |
| 2012/0284791 A1 | 11/2012 | Miller |

(56) References Cited

U.S. PATENT DOCUMENTS

| | | |
|---|---|---|
| 2012/0290669 A1 | 11/2012 | Parks |
| 2012/0290919 A1 | 11/2012 | Melnyk |
| 2012/0291102 A1 | 11/2012 | Cohen |
| 2012/0314580 A1 | 12/2012 | Hong |
| 2012/0317307 A1 | 12/2012 | Ravindran |
| 2012/0331112 A1 | 12/2012 | Chatani |
| 2013/0041982 A1 | 2/2013 | Shi |
| 2013/0051392 A1 | 2/2013 | Filsfils |
| 2013/0060962 A1 | 3/2013 | Wang |
| 2013/0073552 A1 | 3/2013 | Rangwala |
| 2013/0074155 A1 | 3/2013 | Huh |
| 2013/0091539 A1 | 4/2013 | Khurana |
| 2013/0110987 A1 | 5/2013 | Kim |
| 2013/0111063 A1 | 5/2013 | Lee |
| 2013/0151584 A1 | 6/2013 | Westphal |
| 2013/0163426 A1 | 6/2013 | Beliveau |
| 2013/0166668 A1 | 6/2013 | Byun |
| 2013/0173822 A1 | 7/2013 | Hong |
| 2013/0182568 A1 | 7/2013 | Lee |
| 2013/0185406 A1 | 7/2013 | Choi |
| 2013/0197698 A1 | 8/2013 | Shah |
| 2013/0198119 A1 | 8/2013 | Eberhardt, III |
| 2013/0219038 A1 | 8/2013 | Lee |
| 2013/0219081 A1 | 8/2013 | Qian |
| 2013/0219478 A1 | 8/2013 | Mahamuni |
| 2013/0223237 A1 | 8/2013 | Hui |
| 2013/0227166 A1 | 8/2013 | Ravindran |
| 2013/0242996 A1 | 9/2013 | Varvello |
| 2013/0250809 A1 | 9/2013 | Hui |
| 2013/0282854 A1 | 10/2013 | Jang |
| 2013/0282860 A1 | 10/2013 | Zhang |
| 2013/0282920 A1 | 10/2013 | Zhang |
| 2013/0304937 A1 | 11/2013 | Lee |
| 2013/0329696 A1 | 12/2013 | Xu |
| 2013/0336323 A1 | 12/2013 | Srinivasan |
| 2013/0343408 A1 | 12/2013 | Cook |
| 2014/0003232 A1 | 1/2014 | Guichard |
| 2014/0006565 A1 | 1/2014 | Muscariello |
| 2014/0029445 A1 | 1/2014 | Hui |
| 2014/0032714 A1 | 1/2014 | Liu |
| 2014/0040505 A1 | 2/2014 | Barton |
| 2014/0044258 A1* | 2/2014 | Grewal ............... H04N 21/266 380/200 |
| 2014/0074730 A1 | 3/2014 | Arensmeier |
| 2014/0075567 A1 | 3/2014 | Raleigh |
| 2014/0082135 A1 | 3/2014 | Jung |
| 2014/0089454 A1 | 3/2014 | Jeon |
| 2014/0096249 A1 | 4/2014 | Dupont |
| 2014/0129736 A1 | 5/2014 | Yu |
| 2014/0136814 A1 | 5/2014 | Stark |
| 2014/0140348 A1 | 5/2014 | Perlman |
| 2014/0143370 A1 | 5/2014 | Vilenski |
| 2014/0146819 A1 | 5/2014 | Bae |
| 2014/0149733 A1 | 5/2014 | Kim |
| 2014/0156396 A1 | 6/2014 | deKozan |
| 2014/0165207 A1 | 6/2014 | Engel |
| 2014/0172783 A1 | 6/2014 | Suzuki |
| 2014/0172981 A1 | 6/2014 | Kim |
| 2014/0173034 A1 | 6/2014 | Liu |
| 2014/0192717 A1 | 7/2014 | Liu |
| 2014/0195328 A1 | 7/2014 | Ferens |
| 2014/0195666 A1 | 7/2014 | Dumitriu |
| 2014/0233575 A1 | 8/2014 | Xie |
| 2014/0237085 A1 | 8/2014 | Park |
| 2014/0280823 A1 | 9/2014 | Varvello |
| 2014/0281489 A1 | 9/2014 | Peterka |
| 2014/0281505 A1 | 9/2014 | Zhang |
| 2014/0282816 A1 | 9/2014 | Xie |
| 2014/0289325 A1 | 9/2014 | Solis |
| 2014/0289790 A1 | 9/2014 | Wilson |
| 2014/0314093 A1 | 10/2014 | You |
| 2014/0365550 A1 | 12/2014 | Jang |
| 2015/0006896 A1 | 1/2015 | Franck |
| 2015/0018770 A1 | 1/2015 | Baran |
| 2015/0032892 A1 | 1/2015 | Narayanan |
| 2015/0063802 A1 | 3/2015 | Bahadur |
| 2015/0095481 A1 | 4/2015 | Ohnishi |
| 2015/0095514 A1 | 4/2015 | Yu |
| 2015/0188770 A1 | 7/2015 | Naiksatam |
| 2016/0014095 A1* | 1/2016 | Strayer ............... H04L 63/0428 713/168 |

FOREIGN PATENT DOCUMENTS

| | | |
|---|---|---|
| EP | 0295727 A2 | 12/1988 |
| EP | 0757065 A2 | 7/1996 |
| EP | 1077422 A2 | 2/2001 |
| EP | 1384729 A1 | 1/2004 |
| EP | 2124415 A2 | 11/2009 |
| EP | 2214357 A1 | 8/2010 |
| WO | 03005288 A2 | 1/2003 |
| WO | 03042254 A1 | 5/2003 |
| WO | 03049369 A2 | 6/2003 |
| WO | 03091297 A1 | 11/2003 |
| WO | 2007113180 A1 | 10/2007 |
| WO | 2007144388 A1 | 12/2007 |
| WO | 2011049890 A1 | 4/2011 |

OTHER PUBLICATIONS

"CCNx," http://ccnx.org/. downloaded Mar. 11, 2015.
"The FP7 4WARD project," http://www.4ward-project.eu/. downloaded Mar. 11, 2015.
"Introducing JSON," http://www.json.org/. downloaded Mar. 11, 2015.
"Microsoft PlayReady," http://www.microsoft.com/playready/. downloaded Mar. 11, 2015.
"Named-data networking," http://named-data.net/. downloaded Mar. 11, 2015.
"Pursuing a pub/sub internet (PURSUIT)," http://www.fp7-pursuit.ew/PursuitWeb/. downloaded Mar. 11, 2015.
"Scalable and adaptive internet solutions (SAIL)." http://www.sail-project.eu/. downloaded Mar. 11, 2015.
B. Ahlgren, C. Dannewitz, C. Imbrenda, D. Kutscher, and B. Ohlman, A survey of information-centric networking, IEEE Communications Magazine, vol. 50, No. 7, pp. 26-36, Jul. 2012.
J. Bethencourt, A, Sahai, and B. Waters, "Ciphertext-policy attribute-based encryption," in Proc. IEEE Security & Privacy 2007, Berkeley, CA, USA, May 2007, pp. 321-334.
M. Blaze. G. Bleumer, and M. Strauss. "Divertible protocols and atomic prosy cryptography," in Proc. Eurocrypt 1998, Espoo, Finland, May-Jun. 1998, pp. 127-144.
D. Boneh, C. Gentry and B. Waters, "Collusion resistant broadcast encryption with short ciphertexts and private keys," in Proc. Crypto 2005, Santa Barbara, CA, USA, Aug. 2005, pp. 1-19.
T. Dierts, "The transport layer security (TLS) protocol version 1.2," IETF RFC 5246, 2008.
A. Ghodsi, S. Shenker, and T. Koponen "Information-centric, networking: seeing the forest for the trees in " in Proc. ACM HotNets 2011, Cambridge, MA, USA, Nov. 2011, pp. 1-6.
V. Goyal, O. Pandey, A. Sahai, and B. Waters, "Attribute-based encryption for fine-grained access control of encrypted data," in Proc. ACM CCS 2006, Alexandria, VA, USA, Oct.-Nov. 2006, pp. 89-98.
M. Green and G. Ateniese, "Identity-based proxy re-encryption," in Proc. ACNS 2007, Zhuhai, China, Jun. 2007, pp. 288-306.
J. Hur, "Improving security and efficiency in attribute-based data sharing," IEEE Trans. Knowledge Data Eng., vol. 25, No. 10, pp. 2271-2282, Oct. 2013.
J. Hur and D.K. Noh, "Attribute-based access control with efficient revocation in data outsourcing systers," IEEE Trans. Parallel Distrib. Syst., vol. 22, No. 7, pp. 1214-1221, Jul. 2011.
M. Ion, J. Zhang. and E.M. Schooler, "Toward content-centric privacy in ICN: Attribute-based encryption and routing," in Proc. ACM SIGCOMM ICN 2013, Hong Kong, China, Aug. 2013, pp. 39-40.
V. Jacobson, D.K. Smetters, J.D. Thornton, M.F. Plass, N.H. Briggs, and R.L. Braynard, "Networking named content," in Proc. ACM coNEXT 2009, Rome, Italy, Dec. 2009, pp. 1-12.

(56) References Cited

OTHER PUBLICATIONS

S. Jahid, P. Mittal, and N. Borisov, "Easier: Encryption-based access control in social network with efficient revocation," in Proc ACM ASIACCS 2011, Hong Kong, China, Mar. 2011, pp. 411-415.
S. Kamara and K. Lauter, "Cryptographic cloud storage," in Proc. FC 2010, Tenerife, Canary Islands, Spain, Jan. 2010, pp. 136-149.
T. Koponen, M. Chawla, B.-G. Chun, A. Eirmolinskiy, K.H. Kim, S. Shenker, and I. Stoica, "A data-oriented (and beyond) network architecture" ACM SIGCOMM Computer Communication Review, vol. 37, No. 4, pp. 181-192, Oct. 2007.
K. Liang, L. Fang, W. Susilo, and D.S. Wong, "A Ciphertext-policy attribute-based proxy re-encryption with chosen-ciphertext security," in Proc. INCoS 2013, Xian, China, Sep. 2013, pp. 552-559.
P. Mahadevan, E.Uzun, S. Sevilla, and J. Garcia-Luna-Aceves, "CCN-krs: A key resolution service for ccn," in Proceedings of the 1st International Conference on Information-centric Networking, Ser. INC 14 New York, NY, USA: ACM, 2014, pp. 97-106. [Online]. Available: http://doi.acm.org/10.1145/2660129.2660154.
S. Misra, R. Tourani, and N.E. Majd, "Secure content delivery in information-centric networks: Design, implementation, and analyses," in Proc. ACM SIGCOMM ICN 2013, Hong Kong, China, Aug. 2013, pp. 73-78.
M. Naor and B. Pinkas "Efficient trace and revoke schemes," in Proc. FC 2000, Anguilla, British West Indies, Feb. 2000, pp. 1-20.
M. Nystrom, S. Parkinson, A. Rusch, and M. Scott, "PKCS#12: Personal information exchange syntax v.1.1," IETF RFC 7292, K. Moriarty, Ed., Jul. 2014.
I. Psaras, R.G. Clegg, R. Landa, W.K. Chai, and G. Pavlou, "Modelling and evaluation of CCN-caching trees," in Proc. IFIP Networking 2011, Valencia, Spain, May 2011, pp. 78-91.
E. Rescorla and N. Modadugu, "Datagram transport layer security,"IETF RFC 4347, Apr. 2006.
D.K. Smetters, P. Golle, and J.D. Thornton, "CCNx access control specifications," PARC, Tech. Rep., Jul. 2010.
D. Trossen and G. Parisis, "Designing and realizing and information-centric internet," IEEE Communications Magazing, vol. 50, No. 7, pp. 60-67, Jul. 2012.
G. Tyson, S. Kaune, S. Miles. Y. El-Khatib, A. Mauthe, and A. Taweel, "A trace-driven analysis of caching in content-centric networks," in Proc. IEEE ICCCN 2012, Munich, Germany, Jul.-Aug. 2012, pp. 1-7.
W.-G. Tzeng and Z.-J. Tzeng, "A public-key traitor tracing scheme with revocation using dynamic shares," in Proc. PKC 2001, Cheju Island, Korea, Feb. 2001, 207-224.
M. Walfish, H. Balakrishnan, and S. Shenker, "Untangling the web from DNS," in Proc. USENIX NSDI 2004, Oct. 2010, pp. 735-737.
G. Wang, Q. Liu, and J. Wu, "Hierarchical attribute-based encryption for fine-grained access control in cloud storage services," in Proc. ACM CCS 2010, Chicago, IL, USA, Oct. 2010, pp. 735-737.
A. Wolman, M. Voelker, N. Sharma N. Cardwell, A. Karlin, and H.M. Levy, "On the scale and performance of cooperative web proxy caching," ACM SIGHOPS Operating Systems Review, vol. 33, No. 5, pp. 16-31, Dec. 1999.
C.A. Wood and E. Uzun, "Flexible end-to-end content security in CCN," in Proc. IEEE CCNC 2014, Las Vegas, CA, USA, Jan. 2014.
S. Yu, C. Wang, K. Ren, and W. Lou, "Achieving secure, scalable, and fine-grained data access control in cloud computing," in Proc. IEEE INFOCOM 2010, San Diego, CA, USA, Mar. 2010, pp. 1-9.
L. Zhou, V. Varadharajan, and M. Hitchens, "Achieving secure role-based access control encrypted data in cloud storage," IEEE Trans. Inf. Forensics Security, vol. 8, No. 12, pp. 1947-1980, Dec. 2013.
Jacobson, Van et al., "Content-Centric Networking, Whitepaper Describing Future Assurable Global Networks", Palo Alto Research Center, Inc., Jan. 30, 2007, pp. 1-9.
Koponen, Teemu et al., "A Data-Oriented (and Beyond) Network Architecture", SIGCOMM '07, Aug. 27-31, 2007, Kyoto, Japan, XP-002579021, p. 181-192.

Fall, K. et al., "DTN: an architectural retrospective", Selected areas in communications, IEEE Journal on, vol. 28, No. 5, Jun. 1, 2008, pp. 828-835.
Gritter, M. et al., 'An Architecture for content routing support in the Internet', Proceedings of 3rd Usenix Symposium on Internet Technologies and Systems, 2001, pp. 37-48.
"Content Delivery Network", Wikipedia, Dec. 10, 2011, http://en.wikipedia.org/w/index.php?title=Content_delivery_network &oldid=465077460.
"Digital Signature" archived on Aug. 31, 2009 at http://web.archive.org/web/20090831170721/http://en.wikipedia.org/wiki/Digital_signature.
A. Broder and A. Karlin, "Multilevel Adaptive Hashing", Jan. 1990, pp. 43-53.
Detti, Andrea, et al. "CONET: a content centric inter-networking architecture." Proceedings of the ACM SIGCOMM workshop on Information-centric networking. ACM, 2011.
Afanasyev, Alexander, et al. "Interest flooding attack and countermeasures in Named Data Networking." IFIP Networking Conference, 2013. IEEE, 2013.
Ao-Jan Su, David R. Choffnes, Aleksandar Kuzmanovic, and Fabian E. Bustamante. Drafting Behind Akamai: Inferring Network Conditions Based on CDN Redirections. IEEE/ACM Transactions on Networking {Feb. 2009).
Bari, MdFaizul, et al. 'A survey of naming and routing in information-centric networks.' Communications Magazine, IEEE 50.12 (2012): 44-53.
Baugher, Mark et al., "Self-Verifying Names for Read-Only Named Data", 2012 IEEE Conference on Computer Communications Workshops (INFOCOM WKSHPS), Mar. 2012, pp. 274-279.
Brambley, Michael, A novel, low-cost, reduced-sensor approach for providing smart remote monitoring and diagnostics for packaged air conditioners and heat pumps. Pacific Northwest National Laboratory, 2009.
C. Gentry and A. Silverberg, Hierachical ID-Based Cryptography. Advances in Cryptology—ASIACRYPT 2002. Springer Berlin Heidelberg (2002).
Carzaniga, Antonio, matthew J RUtherford, and Alexander L. Wolf. 'A routing scheme for content-based networking.' INFOCOM 2004, Twenty-third Annual Joint Conference of the IEEE Computer and Communications Societies, vol. 2, IEEE, 2004.
Cho, Jin-Hee, Ananthram Swami, and Ray Chen. "A survey on trust management for mobile ad hoc networks." Communications Surveys & Tutorials, IEEE 13.4 (2011):562-583.
Compagno, Alberto, et al. "Poseidon: Mitigating interest flooding DDoS attacks in named data networking." Local Computer Networks (LCN), 2013 IEEE 38th Conference on. IEEE, 2013.
Conner, William, et al. "A trust management framework for service-oriented environments," Proceedings of the 18th international conference on World wide web. ACM, 2009.
Content Centric Networking Project (CCN) [online], http://ccnx.org/releases/latest/doc/technical/, Downloaded Mar. 9, 2015.
Content Mediator Architecture for Content-aware Networks (COMET) Project [online], http://www.comet-project.org/, Downloaded Mar. 9, 2015.
D. Boneh and M. Franklin. Identity-Based Encryption from the Well Pairing. Advances in Cryptology—CRYPTO 2001, vol. 2139, Springer Berlin Heidelberg (2001).
Dabirmoghaddam, Ali, Maziar Mirzazad Barijough, and J. J. Garcia-Luna-Aceves. 'Understanding optimal caching and opportunistic caching at the edge of information-centric networks.' Proceedings of the 1st international conference on Information-centric networking. ACM, 2014.
Detti et al., "Supporting the Web with an information centric network that routes by name", Aug. 2012, Computer Networks 56, pp. 3705-3702.
Dijkstar, Edsger W., and Carel S. Scholten. 'Termination detection for diffusing computations.' Information Processing Letters 11.1 (1980): 1-4.
Dijkstra, Edsger W., Wim HJ Feijen, and A_J M. Van Gasteren. "Derivation of a terminatin detection algorithm for distributed computations," Control Flow and Data Flow concepts of distributed programming Springer Berlin Heidelberg, 1986, 507-512.

(56) References Cited

OTHER PUBLICATIONS

E.W. Dijkstra, W. Feijen, and A.J.M. Van Gasteren, "Derivation of a Termination Detection Algorithm for Distributed Computations," Information Processing Letter, vol. 16, No. 5, 1983.
Fayazbakhsh, S. K., Lin, Y., Tootoonchian, A., Ghodsi, A., Koponen, T., Maggs, B., & Shenker, S. {Aug. 2013). Less pain, most of the gain: Incrementally deployable ICN. In ACM SIGCOMM Computer Communication Review (vol. 43, No. 4, pp. 147-158). ACM.
G. Xylomenos et al., "A Survey of Information-centric Networking Research," IEEE Communication Surveys and Tutorials, Jul. 2013.
Garcia, Humberto E., Wen-Chiao Lin, and Semyon M. Meerkov. "A resilient condition assessment monitoring system." Resilient Control Systems (ISRCS), 2012 5th International Symposium on. IEEE, 2012.
Garcia-Luna-Aceves, Jose J. 'A unified approach to loop-free routing using distance vectors or link states.' ACM SIGCOMM Computer Communication Review. vol. 19, No. 4, ACM, 1989.
Garcia-Luna-Aceves, Jose J. 'Name-Based Content Routing in Information Centric Networks Using Distance Information' Proc ACM ICN 2014, Sep. 2014.
Ghali, Cesar, Gene Tsudik, and Ersin Uzun. "Needle in a Haystack: Mitigating Content Poisoning in Named-Data Networking." Proceedings of NDSS Workshop on Security of Emerging Networking Technologies (SENT). 2014.
Ghodsi, Ali, et al. "Naming in content-oriented architectures."Proceedings of the ACM SIGCOMM workshop on Information-centric networking. ACM, 2011.
Gupta, Anjali, Barbara Liskov, and Rodrigo Rodrigues. "Efficient Routing for Peer-to-Peer Overlays." NSDI. vol. 4. 2004.
Heckerman, David, John S. Breese, and Koos Rommelse. "Decision-Theoretic Troubleshooting," Communications of the ACM. 1995.
Heinemeier, Kristin, et al. "Uncertainties in Achieving Energy Savings from HVAC Maintentance Measures in the Field." ASHRAE Transactions 118.Part 2 {2012).
Herlich Matthias et al., "Optimizing Energy Efficiency for Bulk Transfer Networks", Apr. 13, 2010, pp. 1-3, retrieved for the Internet: URL:http://www.cs.uni-paderborn.de/fileadmin/informationik/ag-karl/publications/miscellaneous/optimizing.pdf (retrieved on Mar. 9, 2012).
Hoque et al., 'NLSR: Named-data Link State Routing Protocol', Aug. 12, 2013, ICN 2013, pp. 15-20.
Intanagonwiwat, Chalermek, Ramesh Govindan, and Deborah Estrin. 'Directed diffusion: a scalable and robust communication paradigm for sensor networks.' Proceedings of the 6th annual international conference on Mobile computing and networking. ACM, 2000.
J. Aumasson and D. Bernstein, "SipHash: a fast short-input PRF", Sep. 18, 2012.
J. Shao and Z. Cao. CCA-Secure Proxy Re-Encryption without Pairings. Public Key Cryptography. Springer Lecture Notes in Computer ScienceVolume 5443 (2009).
V. Jacobson et al., 'Networking Named Content,' Proc. IEEE CoNEXT '09, Dec. 2009.
Jacobson, Van et al. 'VoCCN: Voice Over Content-Centric Networks.' Dec. 1, 2009. ACM ReArch'09.
Jacobson et al., "Custodian-Based Information Sharing," Jul. 2012, IEEE Communications Magazine: vol. 50, Issue 7 (p. 3843).
Ji, Kun, et al., "Prognostics enabled resilient control for model-based building automation systems." Proceedings of the 12th Conference of International Building Performance Simulation Association. 2011.
Katipamula, Srinivas, and Michael R. Brambley. "Review article: methods for fault detection, diagnostics, and prognostics for building systemsa review, Part I," HVAC&R Research 11.1 (2005):3-25.
Katipamula, Srinivas, and Michael R. Brambley. "Review article: methods for fault detection, diagnostics, and prognostics for building systemsa review, Part II," HVAC&R Research 11.2 (2005): 3-25.

L. Wang et al., 'OSPFN: An OSPF Based Routing Protocol for Named Data Networking,' Technical Report NDN-0003, 2012.
Li, Wenjia, Anupam, Joshi, and Tim Finin, "Coping with node misbehaviors in ad hoc networks: A multi-dimensional trust management approach," Mobile Data Management (MDM), 2010 Eleventh International Conference on. IEEE, 2010.
Lopez, Javier, et al. "Trust management systems for wireless sensor networks: Best practices." Computer Communications 33.9 (2010): 1086-1093.
M. Parsa and J.J. Garcia-Luna-Aceves, "A Protocol for Scalable Loop-free Multicast Routing." IEEE JSAC, Apr. 1997.
Mahadevan, Priya, et al. "Orbis: rescaling degree correlations to generate annotated internet topologies." ACM SIGCOMM Computer Communication Review. vol. 37, No. 4, ACM, 2007.
Mahadevan, Priya, et al. "Systematic topology analysis and generation using degree correlations." ACM SIGCOMM Computer Communication Review. vol. 36, No. 4, ACM, 2006.
Matocha, Jeff, and Tracy Camp. 'A taxonomy of distributed termination detection algorithms.' Journal of Systems and Software 43.3 (1998): 207-221.
Matteo Varvello et al., "Caesar: A Content Router for High Speed Forwarding", ICN 2012, Second Edition on Information-Centric Networking, New York, Aug. 2012.
McWilliams, Jennifer A., and Iain S. Walker, "Home Energy Article: A Systems Approach to Retrofitting Residential HVAC Systems," Lawrence Berkeley National Laboratory (2005).
Merindol et al., "An efficient algorithm to enable path diversity in link state routing networks", Jan. 10, Computer Networks 55 (2011), pp. 1132-1140.
Mobility First Project [online], http://mobilityfirst.winlab.rutgers.edu/, Downloaded Mar. 9, 2015.
Narasimhan, Sriram, and Lee Brownston. "HyDE-A General Framework for Stochastic and Hybrid Modelbased Diagnosis," Proc. DX 7 (2007): 162-169.
Omar, Mawloud, Yacine Challal, and Abdelmadjid Bouabdallah. "Certification-based trust models in mobile ad hoc networks: A survey and taxonomy." Journal of Network and Computer Applications 35.1 (2012): 268-286.
R. H. Deng, J. Weng, S. Liu, and K. Chen. Chosen-Ciphertext Secure Proxy Re-Encryption without Pairings, CANS. Spring Lecture Notes in Computer Science vol. 5339 (2008).
Rosenberg, J. "Interactive Connectivity Establishment (ICE): A Protocol for Network Address Translator (NAT) Traversal for Offer/Answer Protocols", Apr. 2010, pp. 1-117.
S. Chow, J. Weng, Y. Yang, and R. Deng. Efficient Unidirectional Proxy Re-Encryption. Progress i Cryptology—AFRICACRYPT 2010. Springer Berlin-Heidelberg (2010).
S. Deering, "Multicast Routing in Internetworks and Extended LANs," Proc. ACM SIGCOMM '88, Aug. 1988.
S. Deering et al., "The PIM architecture for wide-area multicast routing," IEEE/ACM Trans, on Networking, vol. 4, No. 2, Apr. 1996.
S. Kumar et al. "Peacock Hashing: Deterministic and Updatable Hashing for High Performance Networking," 2008, pp. 556-564.
S.J. Lee, M. Gerla, and C. Chiang, "On-demand Multicast Routing Protocol in Multihop Wireless Mobile Networks," Mobile Networks and Applications, vol. 7, No. 6, 2002.
Sandvine, Global Internet Phenomena Report—Spring 2012, Located online at http://www.sandvine.com/downloads/ documents/Phenomenal H 2012/Sandvine Global Internet Phenomena Report 1H 2012.pdf.
Schein, Jeffrey, and Steven T. Bushby. A Simulation Study of a Hierarchical, Rule-Based Method for System-Leved Fault Detection and Diagnostics in HVAC Systems, US Department of Commerce, [Technology Administration], National Institute of Standards and Technology. 2005.
Shani, Guy, Joelle Pineau, and Robert Kaplow. "A survey of point-based POMDP solvers." Autonomous Agents and Multi-Agent Systems 27.1 (2013):1-51.
Sheppard, John W., and Stephyn GW Butcher, "A formal analysis of fault diagnosis with d-matrices." Journal of Electronic Testing 23.4 (2007): 309-322.

(56) References Cited

OTHER PUBLICATIONS

Shih, Eugene et al., 'Wake on Wireless: An Event Driven Energy Saving Strategy for Battery Operated Devices', Sep. 23, 2002, pp. 160-171.

Shneyderman, Alex et al., 'Mobile VPN: Delivering Advanced Services in Next Generation Wireless Systems', Jan. 1, 2003, pp. 3-29.

Solis, Ignacio, and J. J. Garcia-Luna-Aceves. 'Robust content dissemination in disrupted environments.' proceedings of the third ACM workshop on Challenged networks. ACM, 2008.

Sun, Ying, and Daniel S. Weld. "A framework for model-based repair." AAAI, 1993.

T. Ballardie, P. Francis, and J. Crowcroft, "Core Based Trees (CBT)," Proc. ACM SIGCOMM '88, Aug. 1988.

The Despotify Project (2012). Available online at http://despotify.sourceforge.net/.

V. K. Adhikari, S. Jain, Y. Chen, and Z.-L. Zhang. Vivisecting Youtube:An Active Measurement Study. In INFOCOM12 Mini-conference (2012).

Verma, Vandi, Joquin Fernandez, and Reid Simmons. "Probabilistic models for monitoring and fault diagnosis." The Second IARP and IEEE/RAS Joint Workshop on Technical Challenges for Dependable Robots in Human Environments. Ed. Raja Chatila. Oct. 2002.

Vijay Kumar Adhikari, Yang Guo, Fang Hao, Matteo Varvello, Volker Hilt, Moritz Steiner, and Zhi-Li Zhang, Unreeling Netflix: Understanding and Improving Multi-CDN Movie Delivery. In the Proceedings of IEEE INFOCOM 2012 (2012).

Vutukury, Srinivas, and J. J. Garcia-Luna-Aceves. A simple approximation to minimum-delay routing, vol. 29, No. 4, ACM, 1999.

Waldvogel, Marcel "Fast Longest Prefix Matching: Algorithms, Analysis, and Applications", A dissertation submitted to the Swiss Federal Institute of Technology Zurich, 2002.

Walker, Iain S. Best practices guide for residential HVAC Retrofits. No. LBNL-53592, Ernest Orlando Lawrence Berkeley National Laboratory, Berkeley, CA (US), 2003.

Wang, Jiangzhe et al., "DMND: Collecting Data from Mobiles Using Named Data", Vehicular Networking Conference, 2010 IEEE, pp. 49-56.

Xylomeneos, George, et al. "A survey of information-centric networking research," Communications Surveys & Tutorials, IEEE 16.2 (2014): 1024-1049.

Yi, Cheng, et al. 'A case for stateful forwarding plane.' Computer Communications 36.7 (2013):779-791.

Yi, Cheng, et al. 'Adaptive forwarding in named data networking,' ACM SIGCOMM computer communication review 42.3 (2012):62-67.

Zahariadis, Theodore, et al. "Trust management in wireless sensor networks." European Transactions on Telecommunications 21.4 (2010): 386-395.

Zhang, et al., "Named Data Networking (NDN) Project", http://www.parc.com/publication/2709/named-data-networking-ndn-project.html, Oct. 2010, NDN-0001, PARC Tech Report.

Zhang, Lixia, et al. 'Named data networking.' ACM SIGCOMM Computer Communication Review 44.3 {2014): 66-73.

Soh et al., "Efficient Prefix Updates for IP Router Using Lexicographic Ordering and Updateable Address Set", Jan. 2008, IEEE Transactions On Computers, vol. 57, No. 1.

Beben et al., "Content Aware Network based on Virtual Infrastructure", 2012 13th ACIS International Conference on Software Engineering.

Garcia-Luna-Aceves et al., "Automatic Routing Using Multiple Prefix Labels", 2012, IEEE, Ad Hoc and Sensor Networking Symposium.

Gasti, Paolo et al., 'DoS & DDoS in named Data Networking', 2013 22nd International Conference on Computer Communications and Networks (ICCCN), Aug. 2013, pp. 1-7.

Ishiyama, "On the Effectiveness of Diffusive Content Caching in Content-Centric Networking", Nov. 5, 2012, IEEE, Information and Telecommunication Technologies (APSITT), 2012 9th Asia-Pacific Symposium.

J. Lotspiech, S. Nusser, and F. Pestoni, Anonymous Trust: Digital Rights Management using Broadcast Encryption, Proceedings of the IEEE 92.6 (2004).

Kaya et al., "A Low Power Lookup Technique for Multi-Hashing Network Applications", 2006 IEEE Computer Society Annual Symposium on Emerging VLSI Technologies and Architectures, Mar. 2006.

S. Kamara and K. Lauter. Cryptographic Cloud Storage. Financial Cryptography and Data Security. Springer Berlin Heidelberg (2010).

RTMP (2009). Available online at http://wwwimages.adobe.com/www.adobe.com/content/dam/Adobe/en/devnet/ rtmp/pdf/rtmp.specification 1.0.pdf.

Hoque et al., "NLSR: Named-data Link State Routing Protocol", Aug. 12, 2013, ICN'13.

Nadeem Javaid, "Analysis and design of quality link metrics for routing protocols in Wireless Networks", PhD Thesis Defense, Dec. 15, 2010, Universete Paris-Est.

Wetherall, David, "Active Network vision and reality: Lessons form a capsule-based system", ACM Symposium on Operating Systems Principles, Dec. 1, 1999. pp. 64-79.

Kulkami A.B. et al., "Implementation of a prototype active network", IEEE, Open Architectures and Network Programming, Apr. 3, 1998, pp. 130-142.

\* cited by examiner

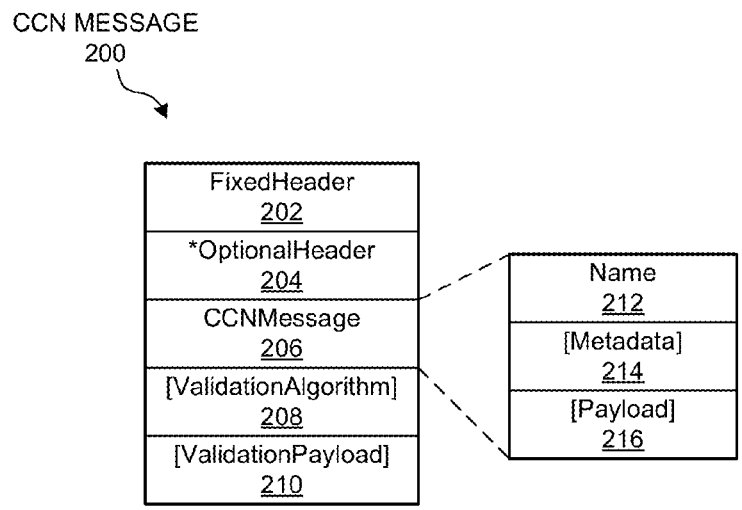
FIG. 2A
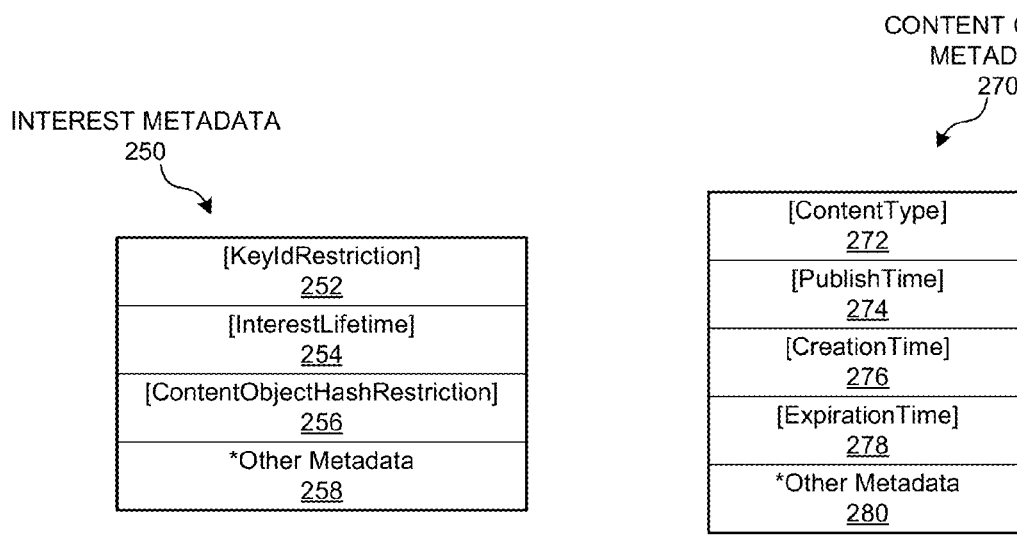
FIG. 2B
FIG. 2C

ACCESS CONTROL FRAMEWORK FOR INFORMATION CENTRIC NETWORKING

BACKGROUND

Field

This disclosure is generally related to Information Centric Networks. More specifically, this disclosure is related to an access control framework for publishing and accessing encrypted data.

Related Art

Information-centric networking architectures (ICNs) are quickly becoming an attracting alternative to the current host-to-host design Internet design in both research and industrial communities. Several novel networking architectures have been recently proposed as instances of the ICN. The most common and fundamental features of these ICN architectures include interest-based content retrieval, content oriented routing, and in-network caching. Interest-based content retrieval and content oriented routing allow users to acquire content from the network via explicit queries for uniquely named content, rather than by establishing point-to-point connection with a target computer that can serve the content. In-network caching permits a router to cache content for predetermined lengths of time such that subsequent requests for content of the same name can be satisfied via the cache, rather than by forwarding the request upstream to a network endpoint identified by the request.

Due to in-network caching, ICN content objects may not always arrive from their original producer. However, if the cached content was encrypted for a given consumer, it is not possible for other consumers to decrypt the content even though they're authorized to access the content. Therefore, ICN architectures typically require requests for encrypted content to be forwarded directly to the content producer so that each consumer can receive a copy of the content which has been encrypted using the consumer's public key. Unfortunately, requiring ICN nodes to forward requests to the content producer does not allow the consumer and publisher to benefit from in-network caching, which can result in slow response times for the consumer and undesirably large request loads for the content producer.

SUMMARY

One embodiment provides a client of an access-control framework that can receive and decrypt a collection of encrypted data based on a publisher's access control specification (ACS). During operation, the client can obtain a Manifest object for a data collection, such that the Manifest includes references to a set of encrypted Content Objects of the data collection, and includes one or more Access Control Specifications (ACS) that each specifies a decryption protocol for decrypting one or more Content Objects of the data collection. The client obtains a respective encrypted Content Object listed in the Manifest over an Information Centric Network (ICN). The client also obtains, from the Manifest, an ACS associated with the respective encrypted Content Object, and decrypts the respective encrypted Content Object using the decryption protocol specified in the ACS.

In information centric networks (ICN), each piece of content is individually named, and each piece of data is bound to a unique name that distinguishes the data from any other piece of data, such as other versions of the same data or data from other sources. This unique name allows a network device to request the data by disseminating a request or an Interest that indicates the unique name, and can obtain the data independent from the data's storage location, network location, application, and means of transportation. Named-data network (NDN) or a content-centric network (CCN) are examples of ICN architecture; the following terms describe elements of an NDN or CCN architecture:

Content Object:

A single piece of named data, which is bound to a unique name. Content Objects are "persistent," which means that a Content Object can move around within a computing device, or across different computing devices, but does not change. If any component of the Content Object changes, the entity that made the change creates a new Content Object that includes the updated content, and binds the new Content Object to a new unique name.

Unique Names:

A name in a CCN is typically location independent and uniquely identifies a Content Object. A data-forwarding device can use the name or name prefix to forward a packet toward a network node that generates or stores the Content Object, regardless of a network address or physical location for the Content Object. In some embodiments, the name may be a hierarchically structured variable-length identifier (HSVLI). The HSVLI can be divided into several hierarchical components, which can be structured in various ways. For example, the individual name components parc, home, ndn, and test.txt can be structured in a left-oriented prefix-major fashion to form the name "/parc/home/ndn/test.txt." Thus, the name "/parc/home/ndn" can be a "parent" or "prefix" of "/parc/home/ndn/test.txt." Additional components can be used to distinguish between different versions of the content item, such as a collaborative document.

In some embodiments, the name can include an identifier, such as a hash value that is derived from the Content Object's data (e.g., a checksum value) and/or from elements of the Content Object's name. A description of a hash-based name is described in U.S. patent application Ser. No. 13/847,814 (entitled "ORDERED-ELEMENT NAMING FOR NAME-BASED PACKET FORWARDING," by inventor Ignacio Solis, filed 20 Mar. 2013), which is hereby incorporated by reference. A name can also be a flat label. Hereinafter, "name" is used to refer to any name for a piece of data in a name-data network, such as a hierarchical name or name prefix, a flat name, a fixed-length name, an arbitrary-length name, or a label (e.g., a Multiprotocol Label Switching (MPLS) label).

Interest:

A packet that indicates a request for a piece of data, and includes a name (or a name prefix) for the piece of data. A data consumer can disseminate a request or Interest across an information-centric network, which CCN/NDN routers can propagate toward a storage device (e.g., a cache server) or a data producer that can provide the requested data to satisfy the request or Interest.

In some embodiments, the ICN system can include a content-centric networking (CCN) architecture. However, the methods disclosed herein are also applicable to other ICN architectures as well. A description of a CCN architecture is described in U.S. patent application Ser. No. 12/338,175 (entitled "CONTROLLING THE SPREAD OF INTERESTS AND CONTENT IN A CONTENT CENTRIC NETWORK," by inventors Van L. Jacobson and Diana K. Smetters, filed 18 Dec. 2008), which is hereby incorporated by reference.

In some embodiments, the client can disseminate an Interest for the data collection over ICN, and responsive to disseminating the Interest, receives the Manifest object over ICN.

In some embodiments, the Manifest includes a respective ACS by reference. Also, while obtaining the ACS, the client can obtain, from the Manifest, a name prefix associated with the ACS, and disseminates over, the ICN, an Interest whose name includes the name prefix. Then, responsive to disseminating the Interest, the client receives a Content Object that includes the ACS.

In some embodiments, while decrypting the encrypted Content Object, the client obtains an encrypted key that corresponds to the encrypted Content Object, and obtains a decapsulation key by performing the decryption protocol specified in the ACS. The client then decrypts the encrypted key, using the decapsulation key, to obtain a decryption key, and decrypts the encrypted Content Object using the decryption key.

In some embodiments, while obtaining the decapsulation key, the client obtains a decapsulation-key name which identifies the decapsulation key, and follows a keychain until a key node identified by the decapsulation-key name is reached. A respective key node of the keychain includes a decryption key in encrypted form, and the decryption key is capable of decrypting a decryption key of a next key node of the keychain. The client then obtains the decapsulation key from the identified key node.

In some embodiments, the decryption keys are encrypted using a group-based encryption scheme, and/or a broadcast encryption scheme.

One embodiment provides a client device that uses an Access Control Specification (ACS) to establish a secure end-to-end communication channel with a publisher. During operation, the client can obtain an initiation Manifest object for a data collection. The initiation Manifest includes the ACS that specifies an end-to-end access control scheme for obtaining and decrypting one or more Content Objects of the data collection. The client obtains, a public key of a publisher from the ACS in the initiation Manifest, and determines, from the ACS, an encryption algorithm for a session with the publisher.

The client then disseminates a setup Interest message for the publisher, such that the setup Interest message includes a temporary key encrypted using the determined encryption algorithm and the publisher's public key. In response to disseminating the setup Interest message, the client receives a setup Content Object that satisfies the setup Interest message, such that the setup Content Object includes a session key and a session identifier. The client then disseminates a finish Interest message that includes the session identifier for the publisher, and in response, receives an in-session Manifest that satisfies the finish Interest message. The in-session Manifest includes references to one or more Content Objects of the data collection that are encrypted using the session key.

In some embodiments, the client obtains verification data from the setup Content Object, and verifies the session key using the verification data. Then, in response to determining that the session key is valid, the client proceeds to disseminate the finish Interest message to establish the secure communication channel.

In some embodiments, while verifying the session key, the client computes a hash from one or more of the session key, a key identifier, and an identifier for the determined encryption algorithm. The client than compares the computed hash to the verification data to determine whether the session key is valid.

In some embodiments, the client can obtain a respective Content Object listed in the in-session Manifest over an Information Centric Network (ICN), and decrypting the respective Content Object using the session key.

BRIEF DESCRIPTION OF THE FIGURES

FIG. 2A illustrates an exemplary CCN Message in accordance with an embodiment.

FIG. 2B illustrates exemplary Metadata for a CCN Interest message in accordance with an embodiment.

FIG. 2C illustrates exemplary Metadata for a CCN Content Object in accordance with an embodiment.

In the figures, like reference numerals refer to the same figure elements.

DETAILED DESCRIPTION

Figure 1:
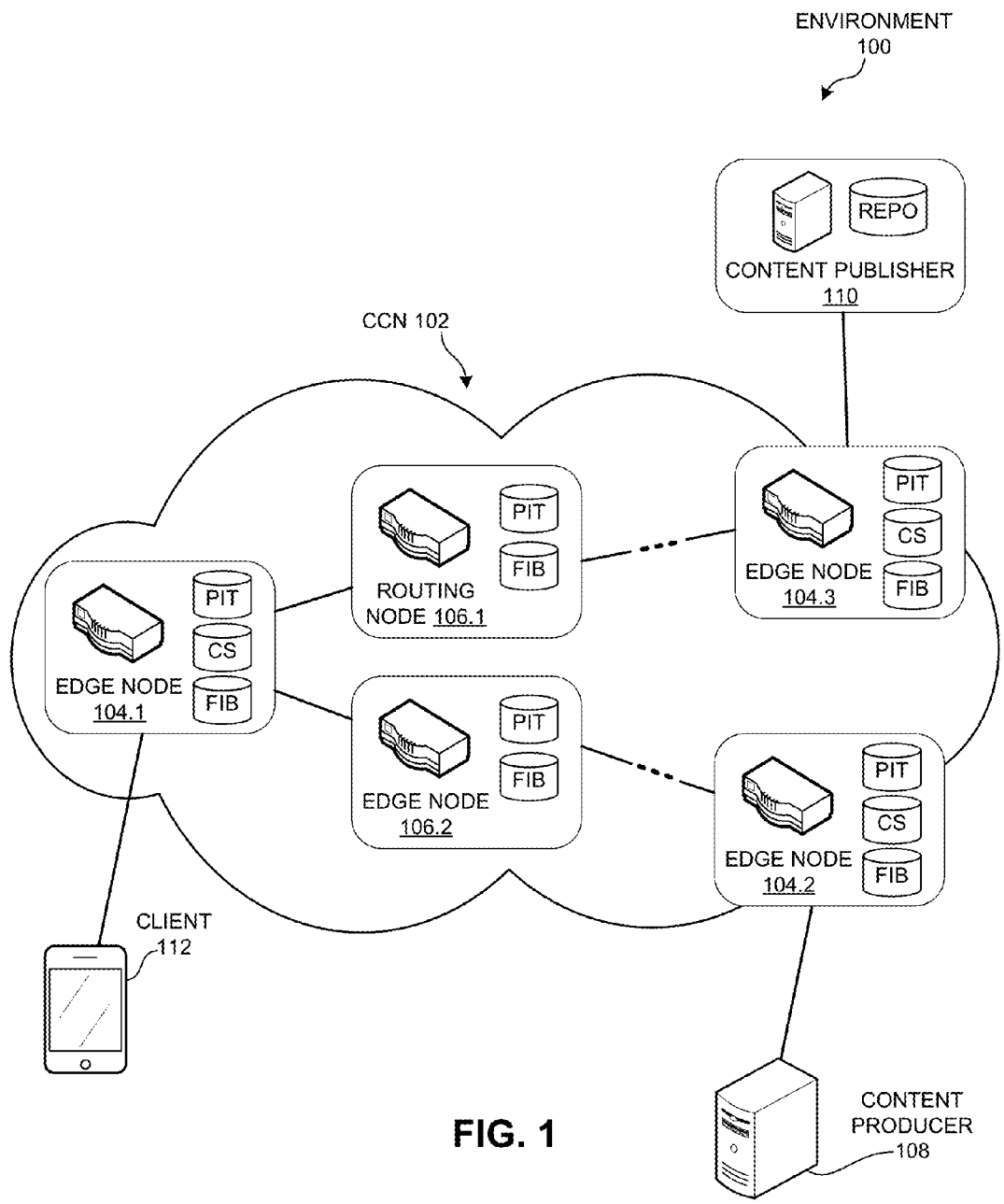
FIG. 1 presents an exemplary network environment that facilitates publishing and accessing a collection of data in encrypted form in accordance with an embodiment.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide an access-control framework that solve the problem of publishing a collection of data over an Information Centric Network (ICN) or a Content Centric Network (CCN) in encrypted form. Specifically, the access control framework allows publishers to use Manifests to publish their content using encrypted Content Objects, and to specify which access control scheme can be used to decrypt and access the content.

For example, in some embodiments, the Manifest can specify a name to an encrypted decryption key for the content, and can specify an access control scheme for obtaining a decapsulation key for the decryption key. Only clients that are allowed access to the content are allowed to obtain the decapsulation key. Alternatively, the Manifest can specify an access-control scheme that allows the client to obtain the encrypted content and a decryption key directly from the publisher, or from a content producer on the publisher's behalf.

Hence, the access control framework can be used to publish content of any type, using any access control scheme. Rather than requiring each publisher to implement their own form of application-specific access control specification and enforcement mechanisms, a publisher can use the access control framework to publish encrypted content using their access control scheme of choice.

In the access control framework, Manifests include access control specifications and key-chains that decouple encrypted content from the access control and decryption information. Moreover, key-chains can themselves be realized using manifests that contain a list of decryption keys necessary to access content protected under arbitrary group-based hierarchies. The keys themselves are based on principals in order to realize fine-grained access control schemes, where a principal is an individual user or a group of principals. A description of Manifests is described in U.S. patent application Ser. No. 14/337,026, entitled "System for Distributing Nameless Objects using Self-Certifying Names," by inventor Marc E. Mosko, filed 21 Jul. 2014), which is hereby incorporated by reference.

In some embodiments, the access control framework can realize at least three types of access control schemes over ICN: a group-based access control scheme, a broadcast access control scheme, and an end-to-end secure communication that provides an ICN variation to TLS. Embodiments of the present invention also provide an ICN application programming interface (API) that producers can use to publish encrypted content, and that consumers can use to access the encrypted content.

Exemplary Network Environment

FIG. 1 presents an exemplary network environment 100 that facilitates publishing and accessing a collection of data in encrypted form in accordance with an embodiment. Specifically, network environment 100 can include a Content Centric Network (CCN) 102, a content producer 108, a content publisher 110, a client 112 (e.g., a content consumer), and a content centric network 102. CCN 102 (or an information-centric network) can include a plurality of edge nodes 104 and routing nodes 106.

For example, a video-streaming service can deploy a content producer 110 that is accessible via CCN 102. Content producer 110 can include a server computer or a computer cluster that interfaces with edge node 104.2 of network 102. Content producer 110 can generate arbitrary content, such as a photo, a video, sensor-collected data, etc. Content producer 110 may or may not host content locally, but can partner with content publisher 110 to publish its content on behalf of content producer 108.

Publisher 110 can convert data from content producer 108 to a collection of Content Objects (or any form of Named Data object, or NDO) that carry chunks of the data, which are named objects with an associated cryptographic signature. Publisher 110 can publish these NDOs via their name over CCN 102, and forwarders 104 and 106 of CCN 102 can forward NDO requests through network 102 from client 112 to publisher 110.

Forwarders include at least two primary elements: a forwarding information base (FIB) and a pending interest table (PIT). The forwarder can use the FIB to route an incoming Interest message via an output interface toward a content producer or publisher that can satisfy the Interest. In some embodiments, the forwarder can populate the FIB using standard routing protocols or static routes, and matches an Interest name to a FIB entry using longest prefix match. A routing protocol can asynchronously populate the FIB based on the location of published NDOs.

The forwarder can use the PIT to cache a state of pending Interest messages, and an interface from which each Interest message was received. When the forwarder receives a Content Object, the forwarder can perform a longest prefix matching lookup operation on the PIT to identify a matching PIT entry, and uses the matching PIT entry's interface to return the Content Object along a reverse Interest path back to the client that disseminated the corresponding Interest.

In some embodiments, some forwarders can also include a Content Store (CS) that caches Content Objects. For example, forwarder nodes 104 may correspond to edge nodes that provide other computers or networks access to CCN 102. Hence, forwarder nodes 104 may receive Interest messages from client devices, and can cache Content Objects on behalf of content producer 108 and/or content publisher 110. When edge nodes 104 receive an Interest, they may perform an initial longest matching prefix lookup operation on the CS to search for a matching cached Content Object that can satisfy the Interest. If a matching cached Content Object is not found, edge nodes 104 may proceed to forward the Interest over CCN 102 (e.g., based on a matching FIB entry). Hence, the distributed Content Stores over CCN 102 can reduce Content Object retrieval latency over CCN 102.

For example, content producer 108 can include a media-streaming service (e.g., the Netflix media streaming service from Netflix, Inc., of Los Gatos, Calif.) that partners with content publisher 110 to disseminate protected content over CCN in encrypted form, and allows Content Stores across CCN edge nodes 104.1 to cache the encrypted content. Content producer 108 can use the access-control framework to retain control over which entities can consume the content by only allowing paid subscribers to decrypt the content. Hence, content producer 108 can allow the subscribers of the media-streaming service to be able to access the content, but does not require them to obtain the content directly from content producer 108 or content publisher 110.

However, content producer 108 may want to prevent unsubscribed users or a malicious entity to gain access to its cached content. In some embodiments, content producer 108 can encrypt the content (e.g., media stream segments) and the content's encryption key prior to returning the content to a client 112 that requested the content. This content and its decryption key can then be cached at Content Stores along a return path to client 112. Then, if another client requests the content, this other client can obtain the encrypted content from the Content Store, and only subscribed users are able to decrypt the decryption key and the content.

To achieve this, content producer 108 provides a Manifest that includes a link to the content's segments and the decryption key to users that are paid subscribers. The Manifest also includes an Access Control Specification (ACS) that specifies which access-control scheme is being used to protect the content, such as a variation of a broadcast-based encryption, a session-based encryption, a group-based encryption, or any other encryption protocol now known or later developed. This ACS can specify the encryption/decryption algorithm for the collection, how to obtain the decryption key for the collection, etc. Hence, content producer 108 does not need to disseminate an access control scheme for each Content Object in the collection. Rather, the Manifest for the collection can specify the necessary information for controlling access to each Content Object or stream segment in the collection.

In a session-based encryption scheme, for example, client 112 can decrypt the content using a personal decryption key for as long as the current session is active with publisher 110, or in some variations, for as long as the client device's user is a valid subscriber of content producer 108. The session-based encryption protocol can encrypt content or its decryption key using a symmetric key specific to the user session. When client 112 establishes a session with content publisher 110 (e.g., when issuing a request for a piece of content), content publisher 110 can return a Manifest that includes a list of media stream segments that are encrypted using the session key, or includes a decryption key (encrypted using the session key) that client 112 can use to decrypt cached media stream segments. Then, after using the content's decryption key, client 112 can obtain and decrypt the media stream segments of the requested content from any Content Store or server of CCN 102 that hosts the content segments.

In some embodiments, the access-control framework can support arbitrary types of encryption that are appropriate for different access control policies, and retains the efficiency of CCN content retrieval by using in-network caches for caching and retrieving encrypted content. For example, a key manager (not shown) can issue a symmetric key for content encryption, and can issue a public-private key pair for encrypting the symmetric key. When content producer 108 generates content (e.g., either on-demand or by reading data from persistent storage), content producer 108 sends the content to content publisher 110 that encrypts the content chunks using the symmetric key, and publishes the encrypted Content Objects over CCN 102. An access policy manager of content producer 108 can encrypt the symmetric key under a given user's public key, and publishes the encrypted symmetric key over the network as well. Any Content Store along CCN 102 can cache the encrypted content or encrypted symmetric key once they are published over CCN 102.

In some embodiments, a user's client device 112 can obtain his public-private key pair through a secure channel with content producer 108. Also, client 112 can obtain the encrypted content and symmetric key over CCN 102 (e.g., from publisher 110 or a Content Store at a CCN forwarder node) by disseminating an Interest over CCN 102, and decrypts the symmetric key if it has a valid key from producer 108. After decrypting the symmetric key, client 112 can use the symmetric key to decrypt the content. While this example consists of multiple entities working in a decentralized manner, in some embodiments, two or more of these entities could be collocated on a single machine or distributed across different network nodes across CCN 102.

The access control framework implements cryptographic access control using hybrid encryption to secure data. Specifically, Content Objects are encrypted under a cryptographically random symmetric key, called the nonce key. The nonce key is then encrypted under another encryption algorithm that is appropriate for the content producer's desired form of access control (e.g., broadcast encryption, attribute-based encryption, RSA, identity-based proxy re-encryption, etc.). Nonce keys are encrypted for principals, which can be individual consumers or groups of individuals.

The individual Content Objects that are listed in the Manifest are encrypted under a nonce key by a predetermined encryption algorithm, such as AES-256-CTR. The Manifest comprises a ListOfNames field that includes the names of the encrypted Content Objects, and comprises a ListOfHashes field that includes hash values of the encrypted Content Objects. Hence, a client that obtains the Manifest can disseminate Interests for groups of encrypted Content Objects sequentially or simultaneously. The ACS field of the Manifest provides the required information to decrypt the encrypted Content Objects, such as the name of the (encrypted) nonce key, parameters of encryption algorithms, etc.

The access control framework encrypts the nonce key by another predetermined encryption algorithm that is appropriate to realize the content producer's desired access control structure. The key that can decrypt the encrypted nonce key is hereinafter referred to as the decapsulation key. The decapsulation key is itself encrypted such that only authorized principals (e.g., principals in possession of or having access to the appropriate private decryption key) can decrypt the decapsulation key.

For example, the content producer can assign to each principal i a public-private key pair ($PK_i$, $SK_i$), such that individual clients initially have their own principal key pairs. The encryption of $SK_i$ by a public key cryptographic algorithm under $PK_j$ is denoted by $EncPKC(SK_i, PK_j)$. Hence, when the principal group X is authorized, the decapsulation key DKX to X is encrypted as $EncX(DK_X, PK_X)$. A User "A" can then obtain the decapsulation key $DK_X$ by retrieving the cyphertexts $Enc(SK_X, PK_A)$ and $Enc(DK_X, PK_X)$ using only their own private key $SK_A$.

In some embodiments, the set of principal keys may be part of the private key set or keychain. For example, a principal keychain hierarchy may be rooted at a main private key, which is used to decrypt the decapsulation key, with a path to a qualified leaf principal i. If a principal j is a member of the principal group i, then the encrypted private key of principal i may be included in the set of private keys. This enables principal j to use its private key to obtain the private key of principal i, which is then used to sequentially decrypt other private keys in the hierarchy all the way to the main private key root. Again, this root private key is then used to decrypt the decapsulation key. This separation between the decapsulation and principal keys allows principal keys to be distributed offline or obtained out-of-band. Furthermore, the private key set is flexible enough to enable sophisticated access control group hierarchies for any principal.

CCN Messages

FIG. 2A illustrates an exemplary CCN Message 200 in accordance with an embodiment. CCN Message 200 can be used to generate any type of network message over CCN, such as an Interest, a Content Object, or a Manifest. In some embodiments, Manifests are themselves implemented as a type of Content Object.

CCN Message 200 can include a message header, validation data, and a CCNMessage field 206. The message header can include a FixedHeader field 202, and an OptionalHeader field 204, each of which can provide information about the message structures and forwarding information. CCNMessage field 206 provides the message body, which includes a name 212, metadata 214, and a payload 216 (for both Interest and Content Object messages). Moreover, the validation data can include a ValidationAlgorithm field 208 and a ValidationPayload field 210. ValidationAlgorithm field 208 can include a digital signature validation information (e.g., the signature algorithm, a validation algorithm CRC32C, an RSA signature, etc.). ValidationPayload field 210 can include the signature data itself.

CCN Interests and Content Objects are two types of CCN Messages, but they are processed in different ways by CCN network nodes. A Content Object is a Named Data Object (NDO) whose payload field 216 includes published content, which can be located and authenticated by its location-independent CCN name. An Interest, on the other hand, is a message issued by a content consumer (e.g., a client) to request an NDO Content Object. An Interest's name field 212 can include the name of the desired content, and payload field 216 can include any additional information relevant to the request. Moreover, metadata field 214 of Interest and Content Object messages can contain different data that guides how the Interest or Content Object is processed.

FIG. 2B illustrates exemplary Metadata 250 for a CCN Interest message in accordance with an embodiment. Metadata 250 can include a KeyIdRestriction field 252, an InterestLifetime field 254, a ContentObjectHashRestriction field 256, and additional Metadata fields 258.

KeyId field 252 and ContentobjectHashRestriction field 256 allow an Interest message to specify restrictions that control how a Content Object is matched to the Interest. For example, the KeyId limits the match to a specific publisher by checking the key ID used to sign the Content Object, where the KeyID value is stored in the ValidationPayload field of the Content Object. Also, the ContentObjectHashRestriction field 256 restricts the valid matching Content Objects to those whose self-certified name matches the value of ContentObjectHashRestriction field 256. In some embodiments, the self-certified name can include an SHA-256 hash of the CCNMessage field, ValidationAlgorithm field, and ValidationPayload field.

Additional Metadata fields 258 can include additional information that content producers can use to generate dynamic content. In some embodiments, forwarders across CCN do not store data in additional Metadata fields 258 within their local PIT.

FIG. 2C illustrates exemplary Metadata 270 for a CCN Content Object in accordance with an embodiment. Metadata 270 can include a ContentType field 272 that specifies the type of content carried by the Content Object, such as a Manifest, text, image, binary large object (blob), etc. Metadata 270 can also include a PublishTime field 274 that specifies a time and date when the payload's data was published, a CreationTime field 276 that specifies when the Content Objet was created, and an ExpirationTime field 278 which specifies when the Content Object's data expires. Moreover, Metadata 270 can include additional Metadata fields 280, which can include any metadata about the Content Object or the payload which does not govern how the Content Object is forwarded along a network.

Manifests and Access Control Specification (ACS)

A Manifest can include an ACS that specifies the encryption algorithm used to encrypt a piece of content. For example, the piece of content can be encrypted using an AES key, which can include a nonce key that is randomly generated. The encrypted content can then be distributed over the network, and authorized clients can access the encrypted nonce key by using a decryption algorithm specified in the ACS to decrypt the nonce key. Once a client decrypts the nonce key, the client can use the nonce key to decrypt the encrypted content.

In some embodiments, a Manifest can list a set of Content Objects that are encrypted using a non-homogenous set of encryption schemes. The Manifest can include multiple ACS objects, such that each ACS can be used to decrypt a different subset of the Manifest's Content Objects. In some embodiments, each Content Object entry in the Manifest can specify a reference to an ACS in the Manifest. Alternatively, each ACS can identify which Content Objects can be decrypted via the decryption scheme specified in the ACS. For example, each ACS can map to a group of Content Objects (e.g., identified by a name prefix of the Content Object). As another example, each ACS and Content Object entry can include a scheme identifier that binds an ACS decryption scheme and one or more Content Objects together.

Figure 3A:
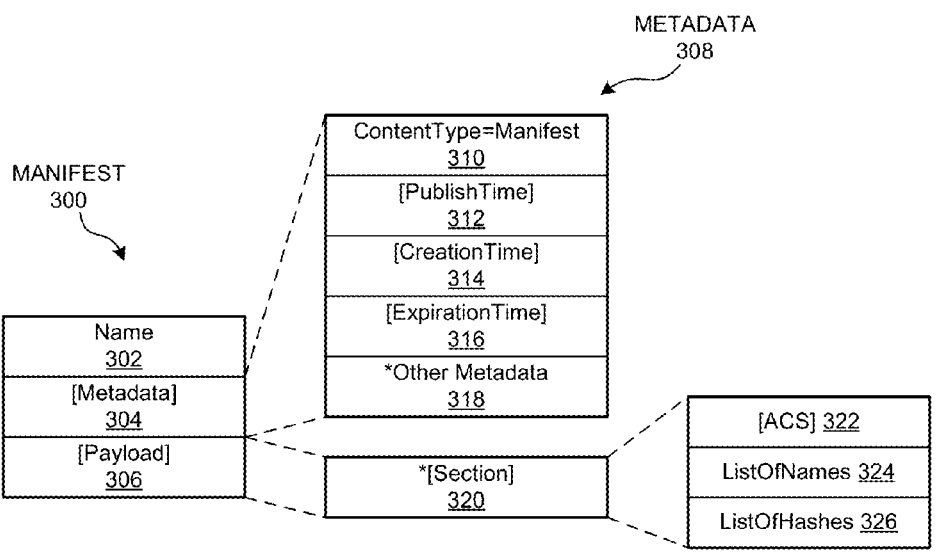
FIG. 3A illustrates an exemplary Manifest in accordance with an embodiment.

FIG. 3A illustrates an exemplary Manifest 300 in accordance with an embodiment. Manifest 300 can include a Name field 302, a Metadata field 304, and a Payload field 306. Name field 302 can specify a name for Manifest 300, such as a name for a protected collection of data. This protected collection of data can include encrypted Content Objects, encrypted decryption keys, and one or more ACS objects that specify how a client can obtain the data collection. Hence, metadata 304 can include information about Metadata 300 itself, and payload 306 can include information about the Content Objects, keys, and ACS objects.

As previously mentioned, Manifest 300 is defined as a type of Content Object. Hence, Metadata 308 of Manifest 300 can include a ContentType field 310 with the value "Manifest." Metadata 308 can also include other Content Object metadata fields, such as a publish time field 312, a creation time field 314, an expiration time field 316, and an additional metadata section 318.

Payload 306 of Manifest 300 includes information for a logical collection of Content Objects. In some embodiments, payload 306 describes the logical collection by including metadata information on the Content Objects of the collection, and including an ordered list for the hash-based names of the constituent Content Objects of the collection. This format enables clients to issue Interests with self-certifying names for the individual Content Objects listed in payload 306.

For example, payload 306 can include one or more payload sections 320, and each payload section 320 can include a ListOfNames field 324 and a ListOfHashes field 326 that together provide the ordered names of the Content Objects in the collection. ListOfNames field 324 can include CCN names for one or more Content Objects, and ListOfHashes field 326 can include Content Object Hash values (e.g., self-certifying names) for the one or more Content Objects.

Payload section 320 can also include an ACS field 322. If an ACS field exists in ACS field 322, the ACS provides access control information to at least a subset of the Content Objects listed in the same section 320. The ACS can include information necessary to obtain and decrypt a nonce key, and to obtain access to encrypted Content Objects. In some embodiments, Payload section 320 can include an ACS object, or a reference to the ACS object. For example, payload 306 can include an ACS link, such as a CCN name to a Content Object that includes the actual ACS object. This allows Manifest 300 to include multiple complex ACS objects, without consuming a significant amount of data in payload 306.

Moreover, Manifest 300 can include or reference multiple ACS objects, such that each ACS can correspond to a subset of Content Objects listed in Manifest 300. For example, Manifest Payload 306 can include multiple Payload sections 320 (e.g., the illustrated asterisk designates that zero or more instances may exist), such that each Payload section 320 includes (or references) an ACS and its corresponding subset of Content Objects. Hence, Manifest Metadata 308 can include multiple ListOfNames and multiple ListOfHashes fields, one list per ACS.

As an alternative implementation, Manifest Metadata 308 can include one ListOfNames section 324, one ListOfHashes section 326, and one ACS section 322 that includes multiple ACS entries. Each ACS in section 322 can have an associated ACS identifier, and each name or hash entry of section 324 or section 326 has an associated ACS identifier which specifies which ACS corresponds to the name or hash entry. Thus, when fetching a Content Object referenced in ListOfNames 324, the client can use the corresponding ACS identifier to obtain the corresponding ACS listed ACS section 322.

Figure 3B:
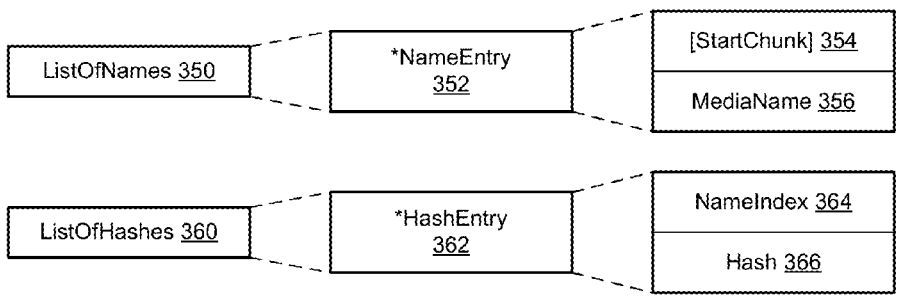
FIG. 3B illustrates an exemplary ListOfNames section and an exemplary ListOfHashes section in accordance with an embodiment.

FIG. 3B illustrates an exemplary ListOfNames section 350 and an exemplary ListOfHashes section 360 in accordance with an embodiment. ListOfNames field 350 includes a list of one or more NameEntry sections 352. A NameEntry section 352 includes a MediaName field 356 that specifies a content name prefix for a piece of data, and can include a StartChunk field 354 that specifies a first chunk number for the piece of data (if the data is partition into a collection of chunks). ListOfHashes field 360 can include a list of one or more HashEntry sections 362. A HashEntry section 362 can include a NameIndex field 364 that identifies a Content Object by a number that corresponds to an entry of the ListOfNames field 350, and includes a Hash field 366 that includes a Content Object Hash (COH) value for the Content Object.

For example, consider a ListOfNames 350 whose first NameEntry section (identified by the NameIndex identifier '1') includes:
IStartChunk=3, MediaName=lci:/parc/obj,
and consider a ListOfHashes section 360 whose first and second entries include:
{NameIndex=1, Hash=0x123}; and
{NameIndex=1, Hash=0xABC}.
Hence, an individual NameEntry section 352 in ListOfNames 350 can correspond to multiple Content Objects (each Content Object carries a different chunk). Also, the first two HashEntry sections of ListOfHashes 360 can correspond to two chunks associated with the NameEntry. The first HashEntry represents a Content Object for a chunk with a name lci:/parc/obj/chunk=3 and a hash digest 0x123, and the second HashEntry represents a Content Object for a chunk with a name lci:/parc/obj/chunk=4 and a hash digest 0xABC.

Hence, Manifests can reduce the overhead involved in retrieving fragmented data, and can allow a content producer or content consumer to avoid having to individually sign or verify each individual Content Object in a collection. For example, a client can use the ListOfNames and ListOfHashes entries to obtain each individual Content Object via an Interest with a self-certifying name, and can verify the Content Objects it receives by performing a binary equality check between the hash digests computed from the received Content Objects and their corresponding HashEntry sections. The client only needs to perform one cryptographic verification operation for each Manifest to verify the collection of Content Objects listed in the Manifest.

In some embodiments, a set of Manifests can be organized into a Manifest tree, where the name of a component Content Object within one Manifest is itself the name of another Manifest (e.g., a child Manifest). If the content consumer can verify the signature of the root Manifest is and trusts the associated key, then the content consumer can also trust other Content Objects and Manifests that are included (directly or indirectly) in the root Manifest and that are trusted by the nature of their self-certifying names (e.g., COH values). This lets the content consumer to avoid having to perform cryptographic validation on these referenced Content Objects and Manifests that can be validated by their self-certifying names.

Figure 4:
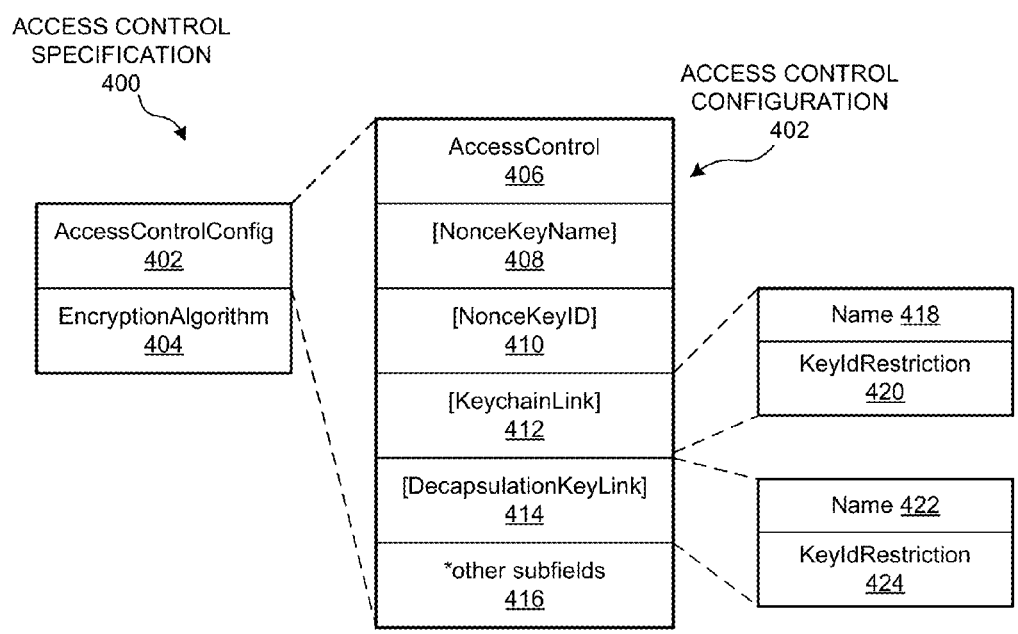
FIG. 4 illustrates an exemplary Access Control Specification (ACS) 400 in accordance with an embodiment.

FIG. 4 illustrates an exemplary Access Control Specification (ACS) 400 in accordance with an embodiment. ACS 400 can include an AccessControlConfiguration field 402 and an EncryptionAlgorithm field 404. EncryptionAlgorithm field 404 specifies an encryption/decryption algorithm that was used to secure the collection data, and parameters for the encryption/decryption algorithm are used to encrypt the content objects listed in the manifest. For example, when using JavaScript Object Notation (JSON), the EncryptionAlgorithm value is encoded as:
{{encryptionAlgorithm: AES-128-CTR, initialCounter: ***} }.

AccessControlConfiguration field 402 describes the information necessary to execute the decryption algorithm specified in EncryptionAlgorithm field 404. Specifically, AccessControlConfiguration 402 includes an Access Control field 406 that specifies the type of access control scheme that handles the symmetric key used in EncryptionAlgorithm field 404. For example, when encoded using JSON, AccessControl field 406 can include:
{type: NonceKey, encapsulationAlgorithm: Naor-Pinkas-BE, ... },
where "type: NonceKey" indicates that access control to the content objects is to be performed through the encapsulation of the nonce key, and "encapsulationAlgorithm: Naor-Pinkas-BE" indicates that the Noar-Pinkas broadcast encryption algorithm is to be used to encapsulate the nonce key.

Note that if the encapsulationAlgorithm is specified in the AccessControlConfiguration field 402, then the algorithm applies to all nodes in the principal key-chain hierarchy. Also, if the access control policy does not include performing encapsulation of the nonce key, the "type" can specify another method for performing access control. When the client initiates a decryption operation to decrypt Content Objects, the client read AccessControl field 406 to determine which types of cryptographic primitives are required.

AccessControlConfiguration field 402 can also include a NonceKeyName field 408 and a NonceKeyID field 410 that a client can use to generate an Interest for obtaining an encrypted nonce key. NonceKeyName field 408 specifies a CCN name of the encapsulated nonce key. The client can use this CCN name to generate and disseminate an Interest for the decapsulation key(s). In some embodiments, NonceKeyName field 408 can include aliases, which are variables of name components used to represent state-dependent names in NonceKeyName field 408. For example, consider the CCN name:
"lci:/parc/obj/noncekey/<principal private key hash>"
where <principal private key hash> includes an alias of a principal-specific value (e.g., a hash value of a qualified principal's private key). A client can use the alias in NonceKeyName field 408 to query the nonce key encrypted with principal-specific values, where the required types of principal-specific values are described by the aliases themselves and/or by AccessControl field 406.

NonceKeyId field 410 specifies the hash value of the (non-encrypted) nonce key. This enables one to easily verify the integrity of the decrypted nonce key. In some embodiments, using a proper collision-resistant hash function (e.g., SHA-256) preserves the integrity and security of the nonce key (with collisions occurring with only negligible probability), since the digest is included in the Manifest digital signature input that is verified before NonceKeyId field 410 is checked.

Also, once the client obtains the encrypted nonce key (e.g., using NonceKeyName field 408), the client can read KeychainLink field 412 and DecapsulationKeyLink field 414 (which can store a name or hash value for the keychain and for a decapsulation key) to follow a chain of encrypted key nodes until the desired nonce key is obtained. KeychainLink field 412 can specify a link to another Manifest (or Manifest hierarchy) called a key-chain. The "link" can include a Name field 418 that specifies the Manifest's name, and can include a KeyIdRestriction field 420 that includes at least the Manifest signer's key identifier (e.g., a KeyId to the Content Object of key-chain).

The keychain can correspond to an ordered list of principal private keys (e.g., encrypted keys) necessary to decrypt the decapsulation key for a piece of content. When the keychain is encapsulated in a Manifest (hereinafter referred to as a keychain Manifest), the client can retrieve the keys of the keychain (e.g., in parallel) that necessary to decrypt the decapsulation key by parsing the keychain Manifest's name/hash lists. The KeychainLink fields in the keychain Manifest can also have aliases to provide a keychain personalized to a given user.

Note that the ACS field of the keychain Manifest can specify the EncryptionAlgorithm field for each of the principal key-chain hierarchy nodes when the keychain Manifest does not specify the encapsulationAlgorithm field of the primary Manifest. For example, if a keychain contains three keys, then the ACS of the keychain has three ordered encapsulationAlgorithm fields in the EncryptionAlgorithm field 404 of the ACS. Alternatively, the type of algorithm may be included in the key Content Objects that are returned from the keychain.

DecapsulationKeyLink field 414 can specify a link to the encrypted decapsulation key. For example, the link can include a Name field 422 that specifies the encrypted decapsulation key's name, and a KeyIdRestriction field 424 that specifies the signer's key ID (e.g., a KeyId to the Content Object of the decapsulation key). The encrypted decapsulation key's name can include aliases to assign a decapsulation key personalized to each qualified principal. Note the client may avoid retrieving and traversing the key-chain when the client already stores the decapsulation key, and successfully validates the decapsulation key.

In some embodiments, the client can obtain the first key node in the chain using KeychainLink 412 of ACS 400, and decrypts the first key node using a local decryption key to obtain another KeychainLink and decryption key to a second key node in the chain. The client eventually reaches an encrypted key node identified by DecapsulationKeyLink 414. This encrypted key node identified by DecapsulationKeyLink 414 is the last node in the keychain, and includes a "decapsulation key" that can be used to decrypt the target nonce key. The client decrypts this last key node in the keychain to obtain the decapsulation key, and uses the decapsulation key to decrypt the encrypted nonce key that the client has obtained. Once the client obtains the decrypted nonce key, the client can use this nonce key to decrypt all or a subset of the Content Objects listed in the Manifest.

In some embodiments, Access Control Configuration 402 can include a set of one or more additional subfields 416 that describe other attributes of any other access control scheme now known or later developed. For example, subfields 416 can include additional parameters that can be used to implement a one-to-one access control scheme similar to TLS (e.g., by including a publisher's public key), or to implement any other access control scheme now known or later developed.

Obtaining Data Based on a Manifest's ACS

Figure 5:
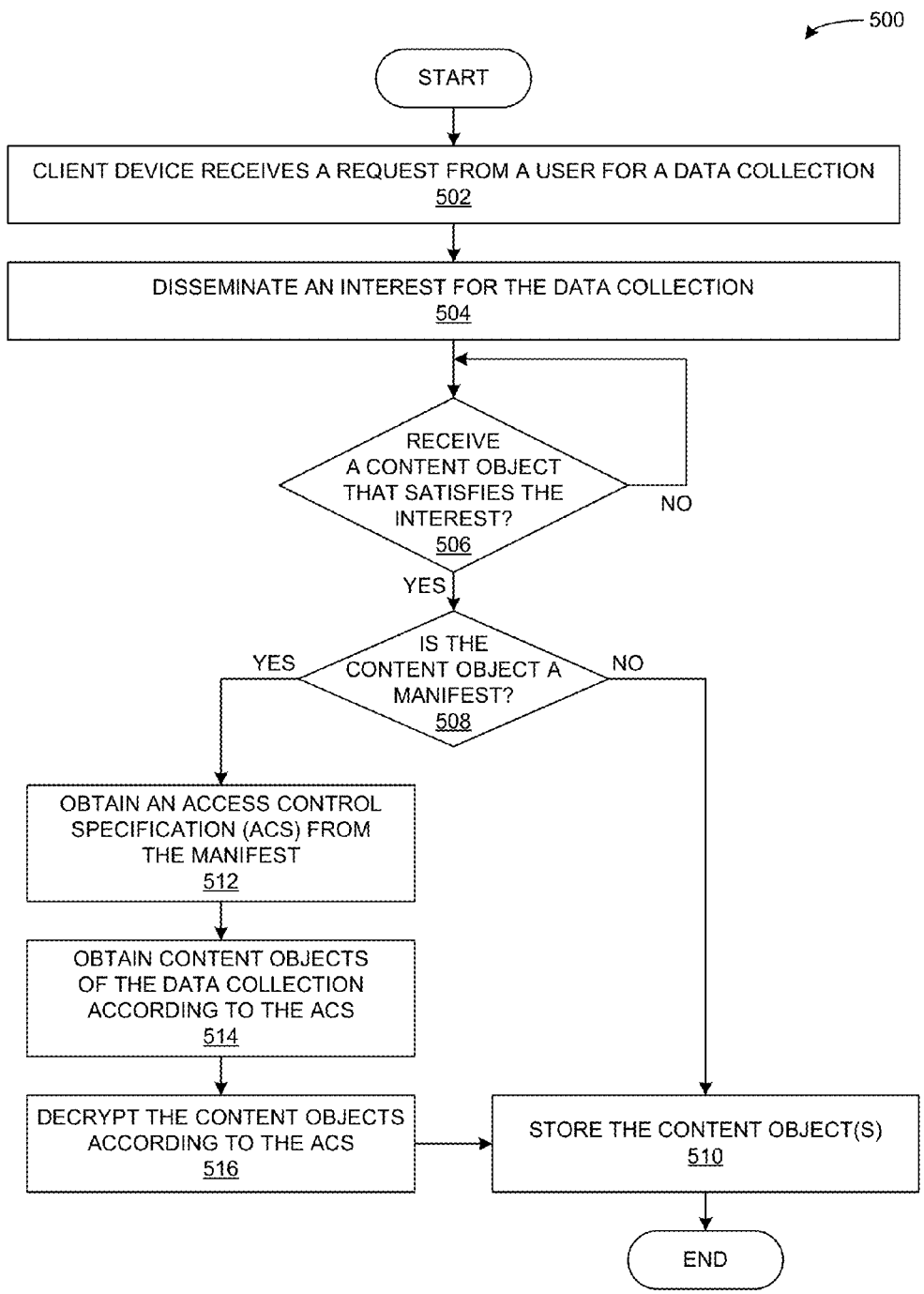
FIG. 5 presents a flow chart illustrating a method for obtaining and decrypting a data collection based on an Access Control Specification in accordance with an embodiment.

FIG. 5 presents a flow chart illustrating a method 500 for obtaining and decrypting a data collection based on an Access Control Specification in accordance with an embodiment. During operation, a client device can receive a request from a user for data or a data collection (operation 502), and disseminates an Interest for the data collection (operation 504). After a predetermined period of time or after receiving a Content Object, the client determines whether it has received a Content Object that satisfies the Interest (operation 506). If not, the client can return to operation 506.

When the client receives a Content Object that satisfies the Interest, the client proceeds to determine whether the Content Object is a Manifest (operation 508). If not, the client can store or otherwise use the Content Object (operation 510). However, if the Content Object is a Manifest, the client analyzes the Manifest to obtain an access control specification (ACS) from the Manifest (operation 512), and obtains secured Content Objects of the data collection according to the ACS (operation 514). The client then decrypts the Content Objects according to the ACS (operation 516), and proceeds to store or otherwise use the Content Objects (operation 510).

Figure 6:
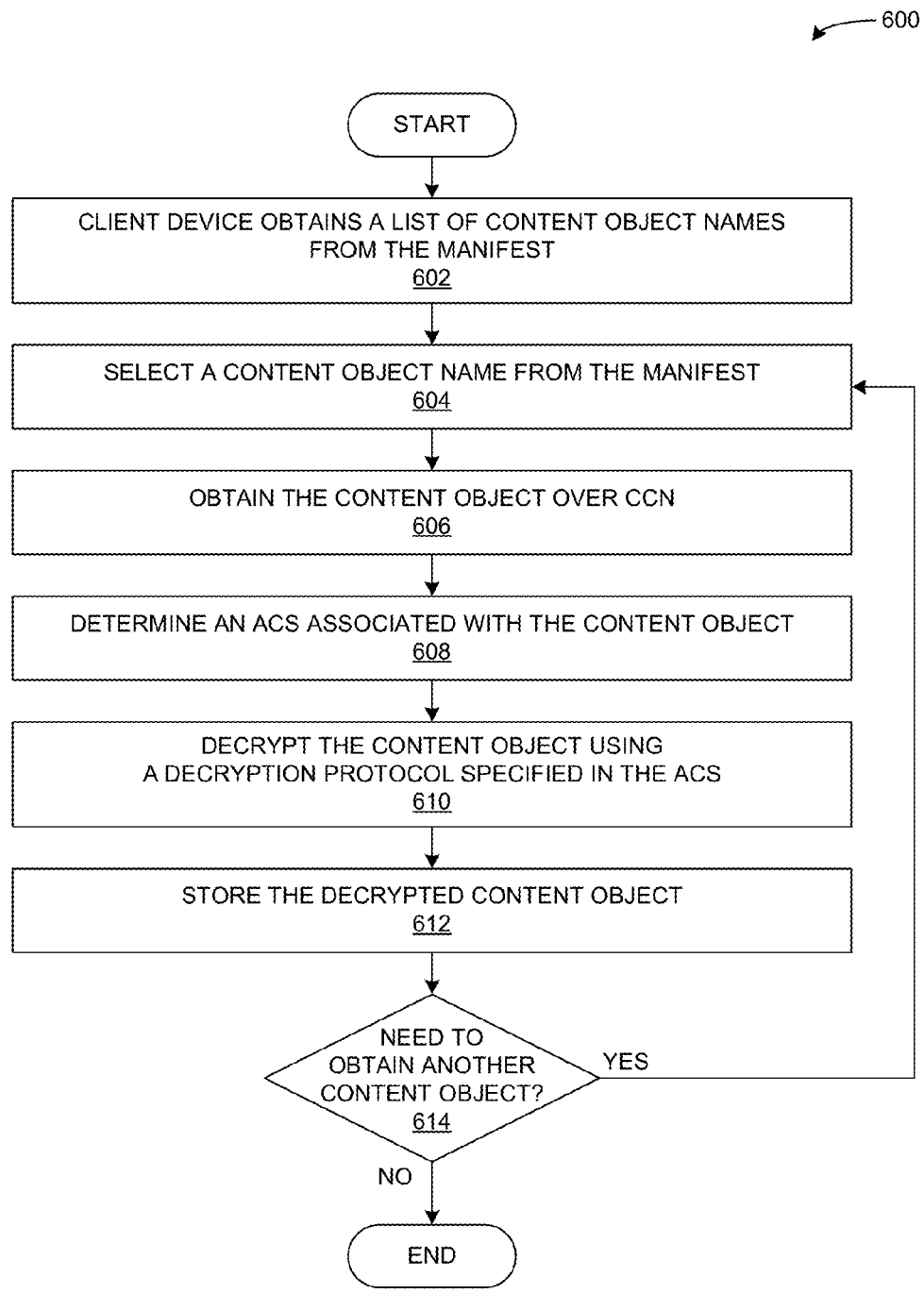
FIG. 6 presents a flow chart illustrating a method for using an ACS to decrypt Content Objects listed in a Manifest in accordance with an embodiment.

FIG. 6 presents a flow chart illustrating a method 600 for using an ACS to decrypt Content Objects listed in a Manifest in accordance with an embodiment. During operation, the client device obtains a list of Content Object names from the Manifest (operation 602), such as from a ListOfNames field from the Manifest's payload. The client selects a Content Object name from the list (operation 604), and obtains the Content Object over CCN by disseminating a CCN Interest that includes the Content Object's name (operation 606).

The client then determines an ACS associated with the Content Object (operation 608), and decrypts the Content Object using a decryption protocol specified in the ACS (operation 610). The client then stores or otherwise uses the decrypted Content Object (operation 612). The client then determines whether it needs to obtain another Content Object listed in the Manifest (operation 614), and if so, returns to operation 604 to select another Content Object name from the Manifest.

Traversing a Key-Chain to Retrieve a Decapsulation Keys

Figure 7:
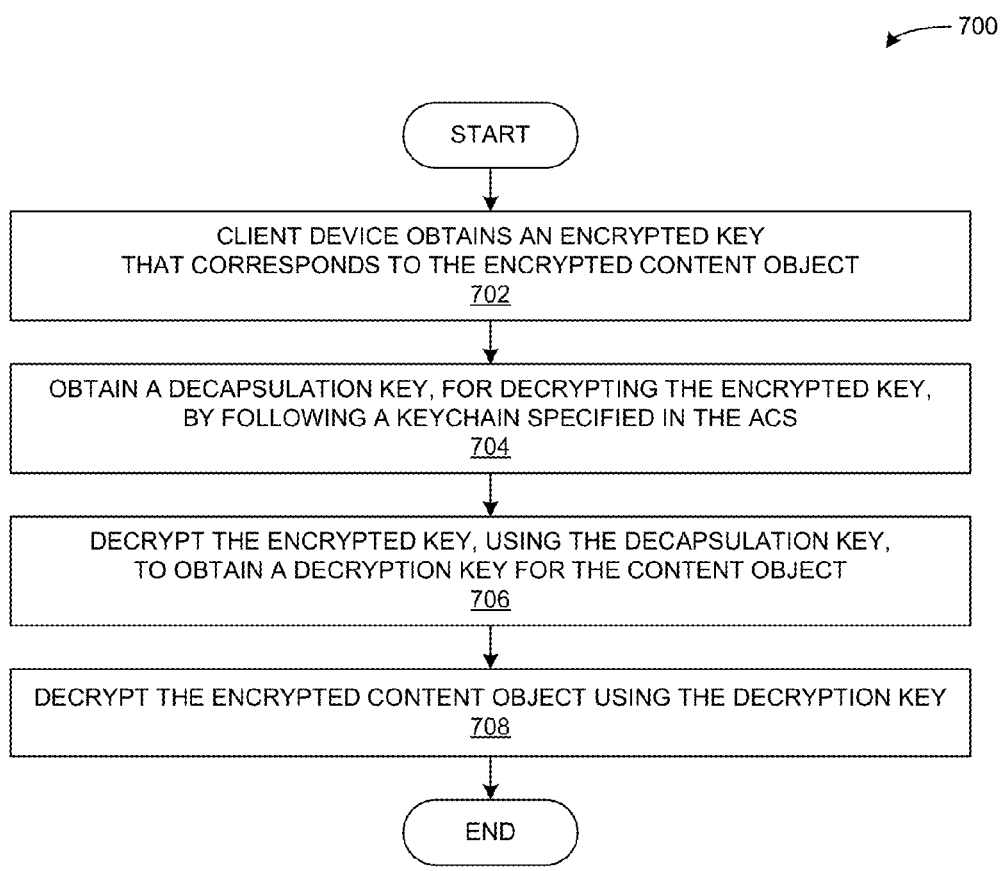
FIG. 7 presents a flow chart illustrating a method for using a keychain specified in the ACS to decrypt Content Objects of a data collection in accordance with an embodiment.

FIG. 7 presents a flow chart illustrating a method 700 for using a keychain specified in the ACS to decrypt Content Objects of a data collection in accordance with an embodiment. During operation, the client device can obtain an encrypted key that corresponds to the encrypted Content Object (operation 702), such as by disseminating an Interest for a nonce key identified in the NonceKeyName subfield of the ACS's AccessControlConfiguration field.

The client then obtains a decapsulation key, for decrypting the encrypted key, by following a keychain specified by the KeychainLink field of the ACS (operation 704). The client then decrypts the encrypted key, using the decapsulation key, to obtain a decryption key for the Content Object (operation 706), and decrypts the encrypted Content Object using the decryption key (operation 708).

Recall that the keychain is a Manifest that provides an ordered list of the private keys required for a user (principal). In some embodiments, the keychain Manifest has the following values in the fields of its ACS:

AccessControl: {type: Keychain},
EncryptionAlgorithm: The encryption algorithm with parameters that are used to encrypt keys listed in the Manifest, such as RSA-1024.

Also, the keychain Manifest's ListOfNames entries provide the ordered list of names of encrypted decryption keys required for a user.

For example, consider a group Z that is qualified to access Content Objects listed in a Manifest. A user B can gain access the Content Objects by retrieving all the keys leading to group Z. For example, user B needs to retrieve the encrypted private keys (decryption keys) of his keychain ancestors, EncPKC($SK_X$, $PK_B$) and EncPKC($SK_Z$, $PK_X$). User B also needs the encrypted decapsulation key assigned to the principal Z, EncPKC($DK_Z$, $PK_Z$). To retrieve these keys, user B first issues Interests for the keychain personalized to his private key $SK_B$ by using KeychainLink of the ACS AccessControlConfiguration field to generate the Interests. In some embodiments, the KeychainLink can include aliases of a user-specific authenticator, such as a CCN name:
  "lci:/parc/obj/key-chain/<user private key hash>."
In the above CCN name, the name segment <principal private key hash> includes an alias of a user-specific value (e.g., a hash value of a qualified user's private key).

Then after disseminating the Interest, user B obtains a ListOfNames field and a List of Hashes field. The ListOfNames field includes the keychain with the ordered key list:
  {StartChunk=1,MediaName=name of EncPKC($SK_X$, $PK_B$)}
  {StartChunk=1,MediaName=name of EncPKC($SK_Z$, $PK_X$)}
  {StartChunk=1,MediaName=name of EncPKC($DK_Z$, $PK_Z$)}, The ListOfHashes field enumerates the hash values of the keychain's chunked Content Objects. At this point, user B retrieves the Content Objects of the encrypted keys and decrypts the keys sequentially, starting with the leaf. If user B's private key can decrypt the nonce key, then the list of keys in the keychain will be empty.

The integrity and secure nature of the listed keys in a keychain can be verified and guaranteed as long as the keychain has a valid signature. Also, since a client can obtain the set of decryption keys necessary to decrypt the nonce key based on a ListOfNames filed in the keychain Manifest, the client can issue an Interest for multiple keys in parallel, which allows the client to maximize its usage of the available network bandwidth.

Recall that there are at least two access control schemes that can be implemented on top of the keychain infrastructure: a group-based access control scheme and a broadcast access control scheme. In a group-based access control scheme where a principal hierarchy exists, the encapsulation algorithm of any decapsulation key is not necessarily coupled to the algorithms used to encrypt other keys in the keychain. For example, RSA may be used to encrypt all non-root nodes in the keychain, and a different algorithm may be used to decrypt the root key. This allows different encryption algorithms to be applied at each level in the root-to-leaf path given in the keychain. The ACS specifies which algorithm applies to each level in the tree so that consumers may apply the appropriate decryption algorithm when traversing the hierarchy path. This decoupling allows any group-based access control policy to be imposed over a group-based principal hierarchy.

Also note that in some access control schemes without a principal hierarchy, such as in "flat" broadcast-based access control, a principal's public/private key pair is specific to the broadcast encryption algorithm. Hence, the nonce key is encrypted under the group public broadcast key, and the private key of each qualified principal in the group may be used to decrypt this decapsulation key.

Group-Based Access Control

A content publisher can encrypt and publish named Content Objects over the CCN network, and can also encrypt (encapsulate) random nonce keys that are used to encrypt each nonce key. In the group-based access control scheme, the content publisher allows certain groups of users (e.g., principals) to access the content simply by generating multiple (different) cyphertexts of the nonce key encrypted for different principal groups. Then, an authorized client in each group can decrypt a cyphertext by traversing a keychain. This means that the qualified principals' public keys are directly used to encrypt the nonce key and hence the decapsulation keys are qualified principals' private keys.

The published content flows across the CCN network topology from the content publisher to individual consumers by traversing core-network and Internet service provider nodes (CCN routers), and any CCN node may cache content as it flows from the producer to the consumer. The authorized clients are already assigned their public-private key pair to be used when traversing the principal hierarchy for key-chains. These keys may be distributed offline or over a secure-session with the content publisher.

A client can obtain a piece of content by issuing an Interest for a Manifest with the name associated with the content. The Manifest can include a group-based ACS that instructs the client on how to obtain the Content Objects that make up the content, as well as the nonce key for decrypting the Content Objects. As an example, the name of the data collection has the CCN prefix "lci:/parc/GE/," and the encapsulation algorithm of keys is implemented using the RSA encryption algorithm, with a 1024-bit key as the encryption. The group-based ACS can have the following configuration:

AccessControl={type: NonceKey, encapsulationAlgorithm: GroupBased-RSA-1024, . . . }
  This field may include any parameters related to the encapsulation algorithm, such as the encryption algorithm of the principals' private keys.
  NonceKeyName=lci:/parc/GE/NonceKey/<principal private key hash>
  The name of the nonce key encrypted under the qualified principals' public keys, including the alias that is specific for each qualified principal.
  NonceKeyId=0x********
  The hash value of the (non-encrypted) nonce key.
  KeychainLink: The link to the key-chain. The link can include subfields:
    Name=lci:/parc/GE/Keychain/<user private key hash>
    The name of the keychain including the alias of the user-specific value.
    KeyIdRestriction=0x********
    The signer's key identifier for key-chains.
  DecapsulationKeyLink: The link to the encrypted decapsulation key.
  The link can include subfields "Name" and "KeyIdRestriction:"
    Name=lci:/parc/GE/PrincipalPrivateKey/<principal
    The name of the decapsulation key (i.e., qualified principal's private key) encrypted under its member's public key, including the aliases that are specific for the qualified principal and its members.
KeyIdRestriction=0x********
    The signer's key identifier for encrypted decapsulation keys.
In some embodiments, because qualified principals' private keys may be the decapsulation keys, the DecapsulationKeyLink field can be filled with the names of their cyphertexts by using some appropriate aliases of values that are specific for qualified principals and their members.

Also, the EncryptionAlgorithm field of ACS can describe the encryption algorithm used to encrypt the content objects listed in the manifest:
    EncryptionAlgorithm={encryptionAlgorithm: AES-128-CTR, initialCounter: 0x********, ... }.
Note that the DecapsulationKeyLink field of the AccessControlConfiguration field in the ACS can be empty when it is possible for the client to retrieve the keychain without checking if the client's key store has the decapsulation key for access control.

Broadcast Access Control

In the broadcast access control, the content publisher can qualify a certain set of principals (content consumers, or clients) to access a collection of Content Objects by encrypting the Content Objects under a random nonce key. The content publisher encapsulates the nonce key with a group-specific (principal-specific) key using broadcast encryption. Each private key qualified to decrypt the decapsulation key is associated with a qualified principal.

Similar to group-based encryption, a client can obtain a piece of content by issuing an Interest for a Manifest with the name associated with the content. As an example, the Content Objects generated by the content publisher have a name with the CCN prefix "lci:/parc/BE/," and the encapsulation algorithm of the nonce key is implemented using the Naor-Pinkas broadcast encryption algorithm. The broadcast-based ACS can have the following configuration.

The EncryptionAlgorithm field of ACS can include the description of the encryption algorithm used to encrypt the content objects listed in the Manifest. The AccessControlConfiguration (ACC) field of the ACS can have the settings:
    AccessControl={type: NonceKey, encapsulationAlgorithm: Naor-Pinkas-BE, ... }
    This field may include any parameters related to the encryption of [28].
NonceKeyName=lci:/parc/BE/NonceKey:
    The name of the nonce key encrypted by the broadcast encryption [28], where it is common to all qualified principals and therefore does not contain aliases.
NonceKeyId=0x********
KeychainLink
    Name=lci:/parc/BE/Keychain/<user private key hash>
    KeyIdRestriction=0x********
DecapsulationKeyLink
    Name=lci:/parc/BE/DecapsulationKey/<principal private key hash>:
        The name of the (encrypted) decapsulation key including the alias that is specific for each qualified principal.
    KeyIdRestriction=0x********

End-to-End Access Control

Recall that in the group-based or broadcast access control schemes, the publisher encrypts content using a unique and random nonce key. However, in these schemes, it is assumed that each client has a public-private key pair as an individual principal. However, if a central key manager is to issue or certify client public-private key pairs over the network, the central key manager would need to securely send each key pair to each client (principal). In some embodiments, a client can establish a secure end-to-end communication session with a target entity (e.g., the central key manager or a publisher) over CCN, similar to a TLS session. This secure end-to-end session is hereinafter referred to as SecureSession, or a SecureSession instance.

Figure 8:
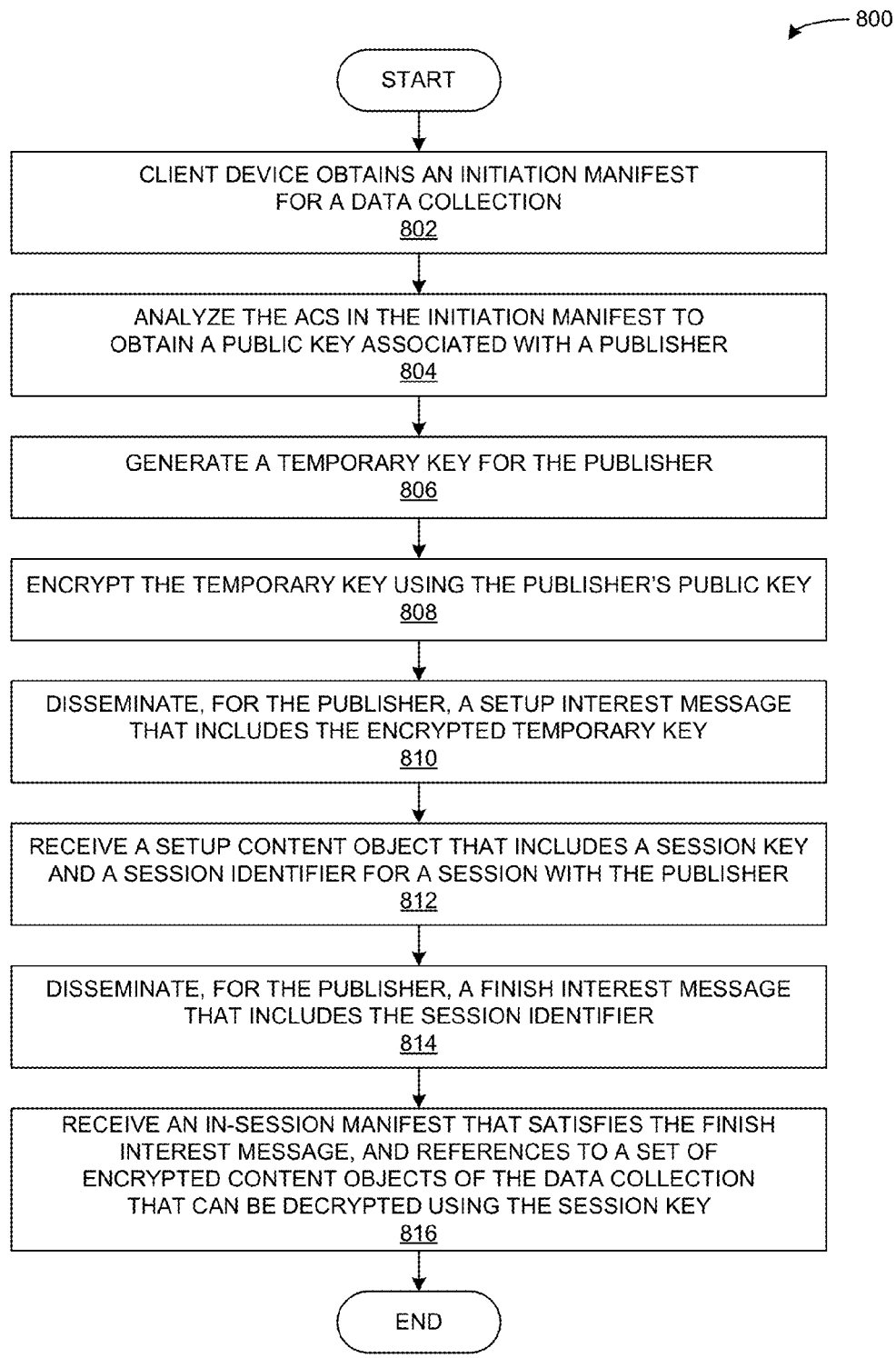
FIG. 8 presents a flow chart illustrating a method for establishing a secure end-to-end session based on an ACS in a Manifest in accordance with an embodiment.

FIG. 8 presents a flow chart illustrating a method 800 for establishing a secure end-to-end session based on an ACS in a Manifest in accordance with an embodiment. During operation, the client device can obtain an initial Manifest for a data collection (operation 802). This initial Manifest is created by the content publisher, and includes the ACS configured for a SecureSession with the publisher, and has an empty ListOfNames and ListOfHashes. The client analyzes the ACS in the initiation Manifest to obtain a public key associated with the publisher (operation 804), and uses the public key to initiate a setup protocol to initiate a new secure session with the publisher.

During a setup phase that initiates the session, the client generates a temporary key for the publisher (operation 806), and encrypts the temporary key using the publisher's public key (operation 808). The client then disseminates a setup Interest message for the publisher (operation 810), such that the setup Interest message includes the encrypted temporary key that is to be used to share the random session key between the user and publisher.

In response to the setup Interest, the publisher generates and returns a Content Object, called the setup Content Object, that includes a fresh random symmetric session key and session identifier, both of which are encrypted by the temporary key provided in the setup Interest. The setup Content Object also includes data the client can use to verify whether the session key is correctly shared between the user and publisher. For example, the verification data can include a signature computed over the concatenation of the temporary key and the session key.

The client then receives the setup Content Object (operation 812), and obtains the session key and a session identifier for a session with the publisher. The setup phase completes when the client uses the verification data in the Content Object to verify the session key.

After the setup phase the client generates and disseminates a finish Interest message for the publisher (operation 814). The finish Interest message's name includes the CCN name prefix for the publisher, and the finish Interest message includes the session identifier appended to the Interest's name or in the Interest's payload section. The publisher responds by returning a finish Content Object to finish establishing the session. The finish Content Object can include a Manifest that is called the in-session Manifest, which is personalized to the user. The in-session Manifest includes an ACS and lists of Content Objects encrypted under the session key. The client receives the finish Content Object that includes the in-session Manifest (operation 816). The client can decrypt the encrypted Content Objects using the client's session key, similar to a TLS-like secure channel that is protected via a symmetric key.

In some embodiments, if the publisher requires client authentication after the initial setup phase, the client can proceed to a resume phase with the publisher. The client disseminates a resume Interest for the publisher over CCN, such that the resume Interest includes the client's public key certificate. Then, in response to disseminating the resume Interest, the client receives a resume Content Object that includes the authentication response of the client's authentication by the publisher. For example, the authentication response can include an ACK message indicating that publisher successfully verified the client's identity, or can include a NACK message indicating that the publisher was not successful in verifying the client's identity. The publisher can also use the resume phase to refresh a timed-out session by re-using the same session identifier and session key.

In some embodiments, the client or publisher can use the SecureSession instance to bootstrap other access control schemes, such as the group-based access control scheme or the broadcast access control scheme.

SecureSession Data Objects

The following data objects provide examples for the detailed configuration of the Interests and Content Objects used during the instantiation of a SecureSession.

Initiation Manifest:

The initiation manifest of SecureSession contains an ACS with information needed to initiate the retrieval of access-controlled content as in other the access control instances. Subfields of the AccessControlConfiguration field in the ACS can have the following values:

AccessControl={Type: SecureSession, Status: Initiation, SessionId: Null}

SetupLink: A link to the setup Content Object.
  Name: The name of the setup Content Objects with a "SecureSession:State" field with the value "Task: Setup and Nonce:<nonce>," where <nonce> is an alias of the random nonce value. For example, the Name field can include a CCN name: "lci:/parc/SecureSession: State={Task: Setup, Nonce:<nonce>}."
  KeyId: Signer's key identifier.

FinishLink: The link to the finish content object.
  Name: The name of the finish Content Objects (e.g., the in-session Manifest) with a "SecureSession:State" field with the values "Task:Finish" and "SessionId: <session id>," where <session id> is an alias of the session identifier. For example, the Name field can include a CCN name: "lci:/parc/SecureSession: State={Task:Finish,SessionIdxsession id>}."
  KeyId: The signer's key identifier.

The EncryptionAlgorithm of the ACS specifies one or more encryption algorithms with parameters that are available at the content publisher unlike nonce-key-based schemes over the CCN access control framework. The field can be encoded in JSON, such as:
  {{encryptionAlgorithm:AES-128-CTR,
    initialCounter: . . . },
    {encryptionAlgorithm:AES-256-CTR,
    initialCounter: . . . }, . . . }.

Setup Procedure:

After retrieving the initiation Manifest of the SecureSession, the client starts the setup phase by issuing the setup Interest over the CCN. The setup Interest has the following values in the response Content Object. In the following examples, the notation "A.B" represents the subfield B of the field A.
  SetupLink.Name: The name of the initiation Manifest, for example, with the random nonce value in <nonce>.
  Metadata.KeyIdRestriction: SetupLink.KeyIdRestriction of the initiation Manifest.
  Payload: Information needed to securely share the session key, which can be written in a type-length-value (TLV) format.
    EncryptionAlgorithm: An algorithm that is selected from EncryptionAlgorithm in the initiation Manifest. The selected algorithm is used to encrypt and decrypt the Content Objects under the shared session key.
    TemporaryKey: A random temporary key of the EncryptionAlgorithm given in the Interest, encrypted under the public key of the publisher's key identifier (given in the KeyId of the Interest).

The publisher can use the random nonce in the name to distinguish Interests issued from different users and different sessions (initiation instances). In response to receiving the setup Interest, the publisher issues the setup Content Object that has the following values:
  Name: A name of the setup Interest.
  Metadata.ContentType: Data.
  Payload: Information necessary to securely share the session key, which can be written in the TLV format.
    HandshakeMessage: A value of "Completed" indicates to move to the finish phase, and a value of "Rejected" indicates the rejection of the connection request. If the publisher needs the optional user authentication, the value is set to "AuthenticationRequest."
    ResumeLink: The link to the finish content object. This field has a non-NULL value only if HandshakeMessage is "AuthenticationRequest." The Link can include a Name subfield and a KeyId subfield.
      Name: The name of the resume Content Objects, such that the "SecureSession:State" field has the values "Task:Finish" and "SessionId:<session id>," and where "<session id>" is an alias of the session identifier. For example, the Name can include the CCN name: "lci:/parc/SecureSession: State={Task:Resume,SessionId:<session id>}"
      KeyId: The signer's key identifier.
    SessionId: The hash of the plaintext session key.
    SessionKey: The session key encrypted by the selected EncryptionAlgorithm under the TemporaryKey.
    VerifyData: The SHA-256 message digest given as:
      Hash(Plaintext Session Key II Selected EncryptionAlgorithm||KeyId of this content object),
      encrypted under the temporary key.

Note that this setup Content Object needs to have the valid signature signed by the publisher with the key identifier indicated in the KeyId in the setup Interest. The client can use the VerifyData field to check the integrity of the decrypted (plaintext) session key.

Finishing the Initiation, and In-Session Manifests:

In order to finalize the initiation flow, the client first verifies the VerifyData value by calculating the hash:
  Hash(Plaintext Session Key II Selected EncryptionAlgorithm||KeyId of this content object)

If the result of the calculation is equal to the VerifyData value in the setup Content Object, the session key is deemed to be correctly shared between the client and publisher, and the parties can therefore move to the finish phase. Otherwise, the setup Content Object is discarded since the session data is corrupt.

As the first step of the finish phase, the client disseminates the finish Interest that notifies the publisher that the client successfully verified the VerifyData value, and requests the finish Content Object (e.g., the in-session Manifest). The Name field corresponds to:
  "lci:/parc/SecureSession:State={Task:Finish,SessionId: <session id>}"

with the session Identifier as the value of the alias <session id>. Also, the finish Interest has the KeyId specified in the FinishLink of the initiation Manifest.

In the response to receiving the finish Interest, the publisher returns the in-session Manifest as the finish content object. The in-session manifests of SecureSession are the standard manifest that list the names and hash values of Content Objects encrypted under the shared session key. By referring to the in-session Manifest, the client can securely retrieve content from the publisher through the secure channel protected by the session key.

Optional User Authentication:

Here we give a detailed description of the resume Interest and resume Content Object used for user authentication in SecureSession instances. If the "HandshakeMessage" field of the setup Content Object has the "AuthenticationRequest" value, the client disseminates a resume Interest for the publisher that has the following values:

Name=ResumeLink.Name of the setup Content Object with the session Identifier in <session id>, such as the Name: "lci:/parc/SecureSession:State={Task:Resume, SessionId:<session id>}"

Metadata.KeyIdRestriction=ResumeLink.KeyIdRestriction of the setup Content Object.

Payload: Information required to authenticate the user, written in the TLV format. The Payload can include the following subfields:

ClientPulicKeyCertificate: The client's public key certificate if this Interest has a signature in the validation data. Otherwise, it is Null.

EncryptedPublicKeyCertificate: The client's public key certificate encrypted under the session key if this interest does not have a signature. Otherwise, it is Null.

If the resume Interest does not have a signature, we can check the integrity and unforgeability of the client's public key certificate by encrypting it using the session key securely shared with the publisher.

As the response to the resume Interest, the publisher issues the resume Content Object that has the HandshakeMessage subfield in the Payload. The HandshakeMessage subfield can include the "Completed" value or the "Rejected" value.

Access Control (AC) Application Programming Interface (API)

In some embodiments, a CCN network node can include a CCN network stack that manages the Interest and Content Object messages that flow in and out of the network node. Local applications can create a stack that processes CCN messages in a desired way, such as to perform encryption, flow-control, or any other message-processing operations on the CCN messages.

Figure 9:
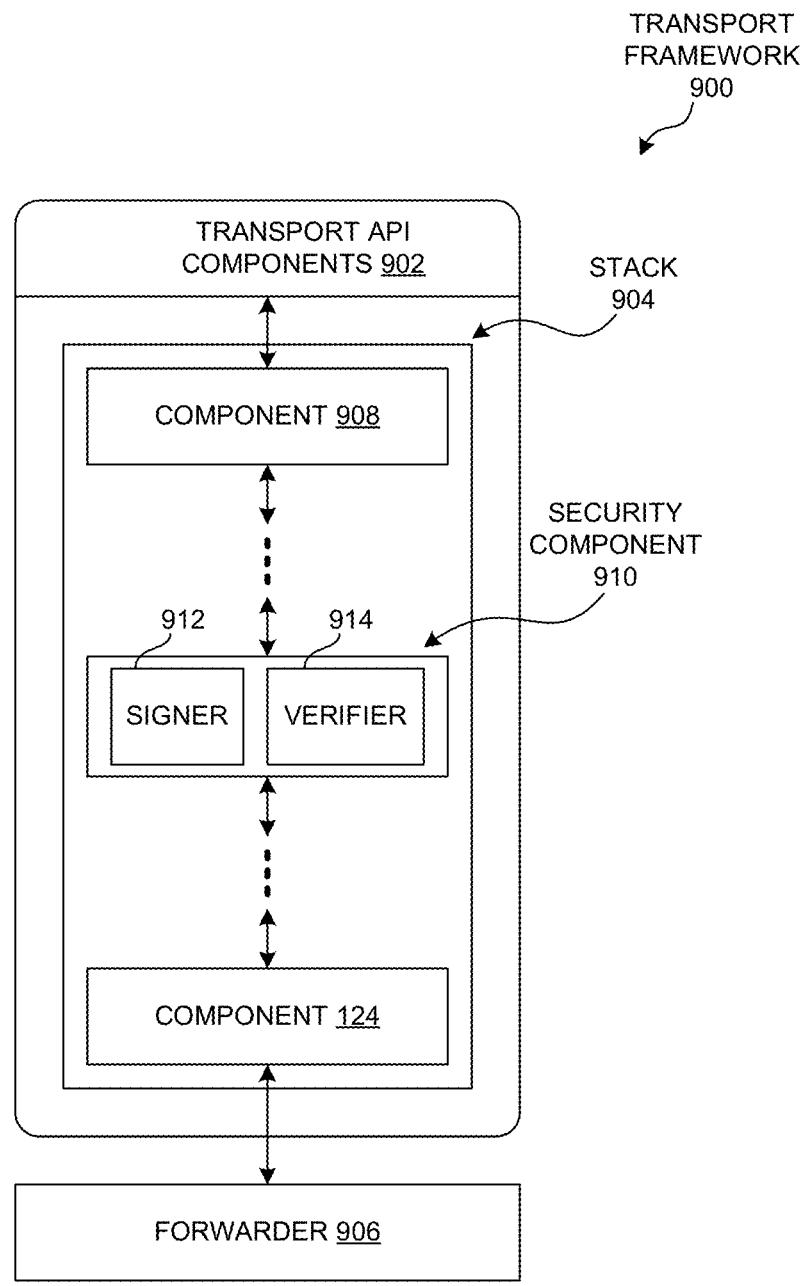
FIG. 9 illustrates an exemplary transport framework in accordance with embodiments of the present invention.

FIG. 9 illustrates an exemplary transport framework 900 in accordance with embodiments of the present invention. A CCN node implements "transport framework" 900 which can dynamically configure a custom stack 904 to satisfy an application's custom "environment execution context." Custom stack 904 can process packets to and/or from a forwarder 906 or any application running on the CCN node, and the stack's components can include any available components that can be organized in any order to satisfy the application's requirements.

In some embodiments, transport framework 900 can include a set of stack-configuring agents that can dynamically configure a stack on-demand. For example, transport framework 900 can include a set of transport API components 902 that implement functions accessible via a library and/or an API. An application can access an API implemented by transport framework 900 by issuing a call to transport framework 900. Transport framework 900 then maps the API call to a corresponding API component of components 902 that implements this specific function, and forwards the API call to this API component.

If a stack doesn't exist for processing the API call, the API component can configure or instantiates a custom stack that can perform the application's API call. For example, the API component can issue a request to transport framework 900, with a request describing the functionality of the custom stack. This functionality description can be high-level, such as to specify a pre-defined behavior or operation that is to be performed on data packets. Transport framework 900 then realizes this behavior or operation by organizing the necessary components into a custom stack 902 (e.g., in custom stack components) in an order that achieves the desired behavior or operation.

Alternatively, the functionality description can be low-level, such as to specify the specific stack components that are to be used, and can specify an order in which the stack components are to be arranged. Moreover, the functionality description can also be specific or generic with respect to the individual components, for example, to request a specific "security component" (e.g., a PKI verification component) or to request any "verification component."

In some embodiments, transport API components can include a Portal API, which provides a set of functions for writing and reading both Interests and Content Objects to and from a stack. Structurally, Interest messages (e.g., CCNxInterest) and Content Object messages (e.g., CCNxContentObject) have a similar data structure. Hence, in some embodiments, the Portal API wraps CCNxInterest and CCNxContentObject instances in CCNxMessage containers, which are then used in various Portal API functions, such as ccnxPortal Read(CCNxMessage *msg) and ccnxPortal Write(CCNxMessage *msg) to read or write messages from and to the transport stack, respectively. Along with the ability to listen for Interests with a particular name prefix, these functions provide the functionality for publishing and retrieving Content Objects via Interest messages.

In some embodiments, transport API components 902 also include an Access Control API built on top of the Portal API, and includes a ProtectedPortal API. The Access Control API allows consumers to access protected content and allows publishers to publish and control access to specific content. Consumers and publishers interface directly with the ProtectedPortal API to create a "protected" transport stack (e.g., stack 904) that transparently handles all access-control-related functionality.

The ProtectedPortal API is instantiated by both consumer and publisher applications with a given set of identities. For a consumer, an identity may wrap a PKCS#12 certificate and private key bundle so as to be able to decrypt Content Object payloads, if necessary. Similarly, a publisher can use a PKCS#12 bundle to sign an egress Content Object generated in response to receiving an Interest message. Other cryptographic keys, such as those used in broadcast access control or proxy re-encryption schemes, may be contained within PKCS#12 files as well. Since a user may manage these keys via separate files, the ProtectedPortal accepts sets of identities at instantiation and at runtime.

Consumer API Sketch

The consumer portion of the ProtectedPortal API extends the underlying Portal API with the functions listed in Table 1. The ProtectedPortal uses information returned in a Content Object Manifest to obtain the appropriate decryption keys to decrypt the nonce key with the correct cryptographic algorithms. Once the ProtectedPortal retrieves the decryption keys, the ProtectedPortal then uses the nonce key to decrypt the content payload for the consumer. The ProtectedPortal performs iterative decryption key resolution and content decryption processes (e.g., SecureSession) internally, and does not expose these processes to the consumer to allow software developers to easily integrate these features into their applications.

TABLE 1

Consumer ProtectedPortal API functions

CCNxMessage *ccnxProtectedPortal Read(CCNxName *msg) - Issue an interest for the content object identified by the given name and, if protected, decrypt and return the resulting payload in the CCNxMessage payload.
CCNxMessage *ccnxProtectedPortal ReadManifest(CCNxName *msg) - Issue an interest for the content object identified by the given name and, if protected, return the content object's manifest serialized within the CCNxMessage payload.
CCNxMessage *ccnxProtectedPortal ReadByManifest(CCNxManifest *msg) - Issue an interest for the content object associated with the given manifest, and return the decrypted content object payload within the CCNxMessage payload.

Publisher API Sketch

In some embodiments, transport API components 902 can include a publisher API that can communicate with and/or control various components of an access control system, such as a distribution server (a Content Store, or a repository), an encryption server, an access policy manager, and a metering server. After instantiating a transport stack 904 for each component, a proxy for each component is instantiated at the top of stack 904 in order to control their respective systems. For example, a key manager proxy component is instantiated at the top of a key manager transport stack, and may communicate with a local key manager application on the local operating system or a remote application via CCN Messages (e.g., by disseminating a CCN Interest to query the key manager, and receiving a Content Object as a response from the key manager). The publisher API implements this communication on behalf of the publisher, and abstracts this communication mechanism away from the publisher APIs.

The functions available via the publisher API are listed in Table 2. The publisher API is accessible via any entity of the access control system, such as the distribution server (a Content Store, or a repository), encryption server, access policy manager, and/or metering server. Once instantiated, a publisher ProtectedPortal instance exposes handles to each of these entities of the access control system so that the application may dynamically create content, change access policies and permissions, and serve protected content and Manifests for consumers. Additionally, after the publisher API is instantiated, each entity creates a transport stack (e.g., stack 904) for a specified namespace so that the consumer ProtectedPortal may issue Interests to communicate with other entities of the access control system. For example, the CCNxAccessControlManagerProxy stack component can listen on the "lci:/parc/csl/acm/" namespace, and consumers requesting content decryption keys can issue Interests with a name derived from the name template "lci:/parc/csl/acm-kcontent name>/<principal id>" to obtain keys necessary to decrypt the nonce key. Also, for session-based access control, the publisher ProtectedPortal stack component can handle the creation and maintenance of DTLS session information on behalf of its local entity.

TABLE 2

Publisher ProtectedPortal API and related proxy functions.

CCNxContentStoreProxy: Proxy for the content store and distribution server
   UploadContent(. . .) - Upload an unprotected content object to a specified namespace.
   UploadProtectedContent(. . .) - Upload a protected content object and corresponding manifest to a specified namespace.
CCNxAccessControlManagerProxy: Proxy for the access control manager
   SetAccessControlType(. . .) - Set the access control type for the given manifest.
   RevokePrincipalFromContent(. . .) - Remove a specified principal, represented by an identity, from access to the specified protected content object.
   AddPrincipalToContent(. . .) - Add a specified principal, represented by an identity, from access to the specified protected content object.
CCNxKeyManagerProxy: Proxy for the (content and secret) key manager
   GenerateContentKey(. . .) - Generate a content encryption (nonce) key for a piece of content with the given name.
   GenerateSecretKey(. . .) - Generate a secret key for the given principal. This requires communication with the CCNxAccessControlManagerProxy to obtain the access control configuration details (e.g., broadcast group information).
CCNxEncryptionServerProxy: Proxy for the encryption (encapsulation) server
   EncryptContent((. . .)) - Encrypt a specified content object with the given nonce key.
   EncryptKey((. . .)) - Encrypt a specified nonce key for a specified principal list. This requires communication with the CCNxAccessControlManagerProxy to obtain the access control configuration details (e.g., broadcast group information).

Figure 10:
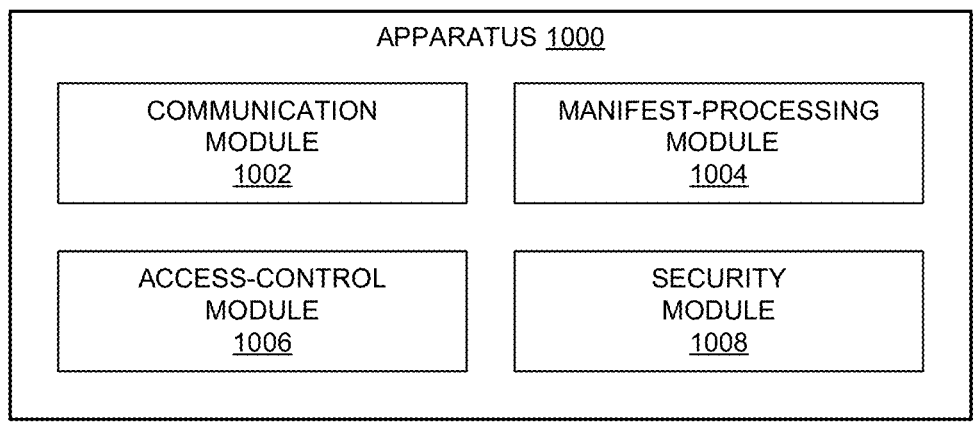
FIG. 10 illustrates an exemplary apparatus that facilitates publishing and accessing a collection of data in encrypted form in accordance with an embodiment.

FIG. 10 illustrates an exemplary apparatus 1000 that facilitates publishing and accessing a collection of data in encrypted form in accordance with an embodiment. Apparatus 1000 can comprise a plurality of modules which may communicate with one another via a wired or wireless communication channel. Apparatus 1000 may be realized using one or more integrated circuits, and may include fewer or more modules than those shown in FIG. 10. Further, apparatus 1000 may be integrated in a computer system, or realized as a separate device which is capable of communicating with other computer systems and/or devices. Specifically, apparatus 1000 can comprise a communication module 1002, a Manifest-processing module 1004, an access-control module 1006, and a security module 1008.

In some embodiments, communication module 1002 can obtain a Manifest for a collection of data, and can obtain a set of encrypted Content Objects listed in the Manifest. Manifest-processing module 1004 can parse the Manifest to obtain an Access Control Specification (ACS) associated with an encrypted Content Object. Access-control module 1006 can process the ACS to obtain the appropriate decryption key for decrypting the Content Object. Security module 1008 can decrypt the Content Object using the decryption key.

Figure 11:
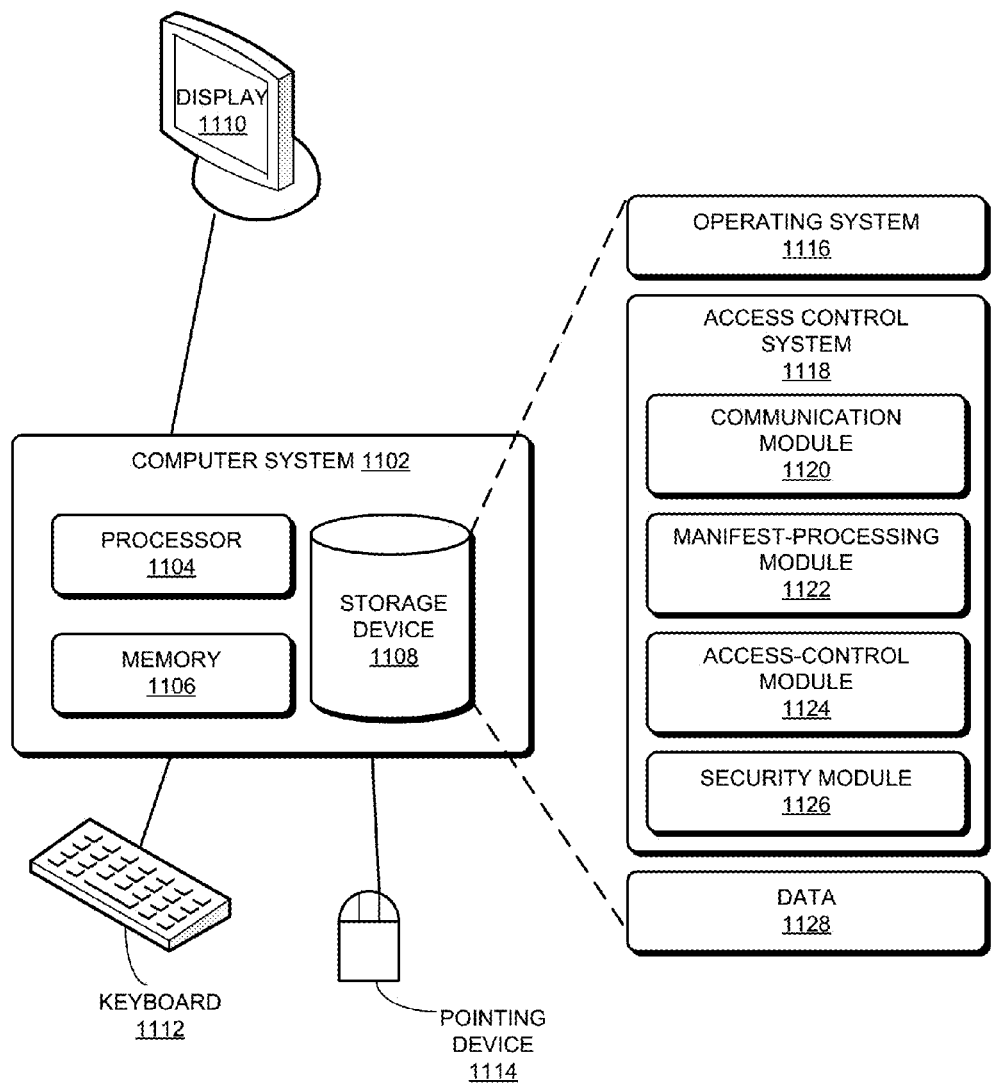
FIG. 11 illustrates an exemplary computer system that facilitates publishing and accessing a collection of data in encrypted form in accordance with an embodiment.

FIG. 11 illustrates an exemplary computer system 1102 that facilitates publishing and accessing a collection of data in encrypted form in accordance with an embodiment. Computer system 1102 includes a processor 1104, a memory 1106, and a storage device 1108. Memory 1106 can include a volatile memory (e.g., RAM) that serves as a managed memory, and can be used to store one or more memory pools. Furthermore, computer system 1102 can be coupled to a display device 1110, a keyboard 1112, and a pointing device 1114. Storage device 1108 can store operating system 1116, an access control system 1118, and data 1128.

Access control system 1118 can include instructions, which when executed by computer system 1102, can cause computer system 1102 to perform methods and/or processes described in this disclosure. Specifically, access control system 1118 may include instructions for obtaining a Manifest for a collection of data, and can obtain a set of encrypted Content Objects listed in the Manifest (communication module 1120). Further, access control system 1118 can include instructions for parsing the Manifest to obtain an Access Control Specification (ACS) associated with an encrypted Content Object (Manifest-processing module 1122).

Access control system 1118 can also include instructions for processing the ACS to obtain the appropriate decryption key for decrypting the Content Object (access-control module 1124), and can also include instructions for decrypting the Content Object using the decryption key (security module 1126).

Data 1128 can include any data that is required as input or that is generated as output by the methods and/or processes described in this disclosure. Specifically, data 1128 can store at least a Manifest, an ACS from the Manifest, and security information and/or session information associated with a publisher.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method, comprising:
obtaining, by a computing device, a Manifest object for a data collection, wherein the Manifest includes references to a set of encrypted Content Objects of the data collection, includes one or more Access Control Specification (ACS) that each specifies a decryption protocol for decrypting one or more Content Objects of the data collection, and includes a respective ACS by reference;
obtaining a respective encrypted Content Object listed in the Manifest over an Information Centric Network (ICN);
obtaining, by the computing device from the Manifest, an ACS associated with the respective encrypted Content Object, which involves:
obtaining, from the Manifest, a name prefix associated with the ACS;
disseminating, over ICN, an Interest whose name includes the name prefix; and
responsive to disseminating the Interest, receiving a Contact Object that includes the ACS; and
decrypting, by the computing device, the respective encrypted Content Object using the decryption protocol specified in the ACS.

2. The method of claim 1, further comprising:
disseminating an Interest for the data collection over ICN; and
responsive to disseminating the Interest, receiving the Manifest object over ICN.

3. The method of claim 1, wherein decrypting the encrypted Content Object involves:
obtaining an encrypted key that corresponds to the encrypted Content Object;
obtaining a decapsulation key by performing the decryption protocol specified in the ACS;
decrypting the encrypted key, using the decapsulation key, to obtain a decryption key; and
decrypting the encrypted Content Object using the decryption key.

4. The method of claim 3, wherein obtaining the decapsulation key involves:
obtaining a decapsulation-key name which identifies the decapsulation key;
following a keychain until a key node identified by the decapsulation-key name is reached, wherein a respective key node of the keychain includes a decryption key in encrypted form, and wherein the decryption key is capable of decrypting a decryption key of a next key node of the keychain; and
obtaining the decapsulation key from the identified key node.

5. The method of claim 4, wherein the decryption keys are encrypted using one or more of:
a group-based encryption scheme; and
a broadcast encryption scheme.

6. A computer-implemented method, comprising:
obtaining, by a computing device, an initiation Manifest object for a data collection, wherein the initiation Manifest includes an Access Control Specification (ACS) that specifies an end-to-end access control scheme for obtaining and decrypting one or more Content Objects of the data collection;
obtaining a public key of a publisher from the ACS in the initiation Manifest;
determining, by the computing device from the ACS, an encryption algorithm for a session with the publisher;
disseminating a setup Interest message for the publisher, wherein the setup Interest message includes a temporary key encrypted using the determined encryption algorithm and the publisher's public key;
receiving a setup Content Object that satisfies the setup Interest message, wherein the setup Content Object includes a session key and a session identifier;
disseminating a finish Interest message for the publisher, wherein the finish Interest message includes the session identifier; and
receiving an in-session Manifest that satisfies the finish Interest message, wherein the in-session Manifest includes references to one or more Content Objects of the data collection that are encrypted using the session key.

7. The method of claim 6, further comprising:
obtaining verification data from the setup Content Object;
verifying the session key using the verification data; and
in response to determining that the session key is valid, disseminating the finish Interest message.

8. The method of claim 6, wherein verifying the session key involves:
computing a hash from one or more of the session key, a key identifier, and an identifier for the determined encryption algorithm; and
comparing the computed hash to the verification data.

9. The method of claim 6, further comprising:
obtaining a respective Content Object listed in the in-session Manifest over an Information Centric Network (ICN); and
decrypting the respective Content Object using the session key.

10. A non-transitory computer-readable storage medium storing instructions that when executed by a computer cause the computer to perform a method, the method comprising:
obtaining a Manifest object for a data collection, wherein the Manifest includes references to a set of encrypted Content Objects of the data collection, includes one or more Access Control Specification (ACS) that each specifies a decryption protocol for decrypting one or more Content Objects of the data collection, and includes a respective ACS by reference;
obtaining a respective encrypted Content Object listed in the Manifest over an Information Centric Network (ICN);
obtaining, by the computing device from the Manifest, an ACS associated with the respective encrypted Content Object, which involves:
obtaining, from the Manifest, a name prefix associated with the ACS;
disseminating, over ICN, an Interest whose name includes the name prefix; and
responsive to disseminating the Interest, receiving a Contact Object that includes the ACS; and
decrypting the respective encrypted Content Object using the decryption protocol specified in the ACS.

11. The storage medium of claim 10, further comprising:
disseminating an Interest for the data collection over ICN; and
responsive to disseminating the Interest, receiving the Manifest object over ICN.

12. The storage medium of claim 10, wherein decrypting the encrypted Content Object involves:
obtaining an encrypted key that corresponds to the encrypted Content Object;
obtaining a decapsulation key by performing the decryption protocol specified in the ACS;
decrypting the encrypted key, using the decapsulation key, to obtain a decryption key; and
decrypting the encrypted Content Object using the decryption key.

13. The storage medium of claim 12, wherein obtaining the decapsulation key involves:
obtaining a decapsulation-key name which identifies the decapsulation key;
following a keychain until a key node identified by the decapsulation-key name is reached, wherein a respective key node of the keychain includes a decryption key in encrypted form, and wherein the decryption key is capable of decrypting a decryption key of a next key node of the keychain; and
obtaining the decapsulation key from the identified key node.

14. The storage medium of claim 13, wherein the decryption keys are encrypted using one or more of:
a group-based encryption scheme; and
a broadcast encryption scheme.

15. A non-transitory computer-readable storage medium storing instructions that when executed by a computer cause the computer to perform a method, the method comprising:
obtaining an initiation Manifest object for a data collection, wherein the initiation Manifest includes an Access Control Specification (ACS) that specifies an end-to-end access control scheme for obtaining and decrypting one or more Content Objects of the data collection;
obtaining a public key of a publisher from the ACS in the initiation Manifest;
determining, from the ACS, an encryption algorithm for a session with the publisher;
disseminating a setup Interest message for the publisher, wherein the setup Interest message includes a temporary key encrypted using the determined encryption algorithm and the publisher's public key;
receiving a setup Content Object that satisfies the setup Interest message, wherein the setup Content Object includes a session key and a session identifier;
disseminating a finish Interest message for the publisher, wherein the finish Interest message includes the session identifier; and
receiving an in-session Manifest that satisfies the finish Interest message, wherein the in-session Manifest includes references to one or more Content Objects of the data collection that are encrypted using the session key.

16. The storage medium of claim 15, further comprising:
obtaining verification data from the setup Content Object;
verifying the session key using the verification data; and
in response to determining that the session key is valid, disseminating the finish Interest message.

17. The storage medium of claim 15, wherein verifying the session key involves:
   computing a hash from one or more of the session key, a key identifier, and an identifier for the determined encryption algorithm; and
   comparing the computed hash to the verification data.

18. The storage medium of claim 15, further comprising:
   obtaining a respective Content Object listed in the in-session Manifest over an Information Centric Network (ICN); and
   decrypting the respective Content Object using the session key.

* * * * *